(12) United States Patent  
Sakama et al.

(10) Patent No.: US 7,557,890 B2  
(45) Date of Patent: Jul. 7, 2009

(54) LIQUID CRYSTAL DISPLAY MOUNTED WITH IC TAG AND METHOD FOR MANUFACTURING THE SAME

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/192,866

(22) Filed: Aug. 15, 2008

(65) Prior Publication Data

US 2008/0309836 A1    Dec. 18, 2008

Related U.S. Application Data

(63) Continuation of application No. 11/007,901, filed on Dec. 8, 2004, now Pat. No. 7,468,774.

(30) Foreign Application Priority Data

Aug. 10, 2004   (JP) ............................. 2004-233460

(51) Int. Cl.  
*G02F 1/1345* (2006.01)

(52) U.S. Cl. ...................... 349/152; 345/204; 345/205

(58) Field of Classification Search ................ None  
See application file for complete search history.

(56) References Cited

U.S. PATENT DOCUMENTS

| | | | |
|---|---|---|---|
| 5,899,549 | A | 5/1999 | Nakanishi et al. |
| 7,073,721 | B2 | 7/2006 | Kano et al. |
| 2004/0189625 | A1 | 9/2004 | Sato |
| 2005/0162320 | A1 | 7/2005 | Huang et al. |

FOREIGN PATENT DOCUMENTS

| | | |
|---|---|---|
| JP | 07-020421 | 1/1995 |
| JP | 08-008628 | 1/1996 |

*Primary Examiner*—Richard H Kim  
(74) *Attorney, Agent, or Firm*—Townsend and Townsend and Crew LLP

(57) ABSTRACT

A liquid crystal display with an IC tag in which information of an IC chip can be read from the surface of the liquid crystal display, while the IC chip can be mounted on the small-size liquid crystal display without lowering the attraction of design thereof. A common electrode is formed in a wide region of an upper electrode layer constituting the liquid crystal display. Antennas are formed in a region of an edge portion of the upper electrode layer where the common electrode is not formed, and within the region of a surface-side glass. An IC chip is placed out of the region of the surface-side glass. X-axis and Y-axis matrix electrodes are formed in a region of a lower electrode layer opposite to the common electrode.

4 Claims, 18 Drawing Sheets

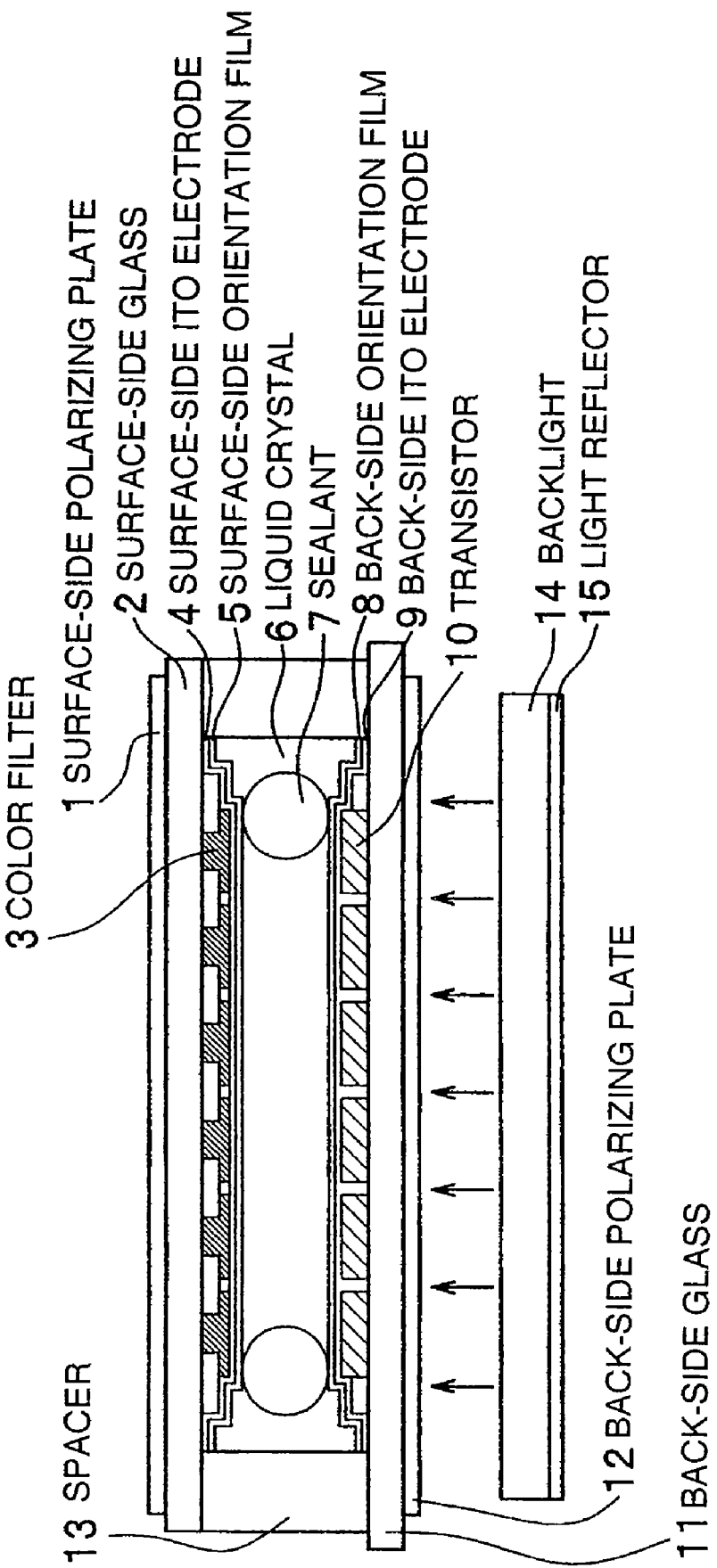

SECTION TAKEN ON LINE A-A

SECTION TAKEN ON LINE A-A

SECTION TAKEN ON LINE B-B

SECTION TAKEN ON LINE C-C

SECTION TAKEN ON LINE D-D

SECTION TAKEN ON LINE E-E

SECTION TAKEN ON LINE E-E

SECTION TAKEN ON LINE E-E

SECTION TAKEN ON LINE E-E

SECTION TAKEN ON LINE B-B

SECTION TAKEN ON LINE C-C

SECTION TAKEN ON LINE D-D

SECTION TAKEN ON LINE A-A

- 2a SURFACE-SIDE GLASS
- 41 UPPER ELECTRODE LAYER
- 42 LOWER ELECTRODE LAYER
- 11a BACK-SIDE GLASS

- 2a SURFACE-SIDE GLASS
- 41 UPPER ELECTRODE LAYER
- SEGMENT 44

SECTION TAKEN ON LINE A-A

- 2a SURFACE-SIDE GLASS
- 23 IC CHIP
- 22a ANTENNA
- ANISOTROPIC CONDUCTIVE FILM 25
- 11a BACK-SIDE GLASS

- 45 COMMON ELECTRODE
- 11a BACK-SIDE GLASS
- 42 LOWER ELECTRODE LAYER
- ANTENNA 22a
- IC CHIP 23
- 22b ANTENNA

SECTION TAKEN ON LINE B-B

US 7,557,890 B2
1

LIQUID CRYSTAL DISPLAY MOUNTED WITH IC TAG AND METHOD FOR MANUFACTURING THE SAME

CROSS-REFERENCES TO RELATED APPLICATIONS

This application is a continuation of U.S. application Ser. No. 11/007,901, filed Dec. 8, 2004, which claims priority from Japanese Application No. 2004-233460, filed Aug. 10, 2004, all of which are herein incorporated by reference for all purposes.

BACKGROUND OF THE INVENTION

The present invention relates to a liquid crystal display mounted with a wireless IC tag for transmitting information stored in an IC chip from an antenna wirelessly, and a method for manufacturing the same.

RELATED ART

In recent years, a wireless IC tag is attached to a liquid crystal display of a portable telephone or the like so that unique information of the portable telephone or the like can be read in a non-contact manner by a reader or the like. Such a wireless IC tag is constituted by a small IC chip for storing information and an antenna for transmitting the information of the IC chip wirelessly. The IC chip and the antenna are integrally formed into a seal member, which is pasted onto a desired place of the liquid crystal display. In such a wireless IC tag, the IC chip has a small package, for example, measuring approximately 0.4 mm in width, 0.4 mm in depth and 0.1 mm in height. On the other hand, the length or area of the antenna becomes comparatively large enough to increase the radiation intensity of radio waves. It is therefore considerably difficult to paste the wireless IC tag onto a small-size liquid crystal display. To solve such a problem, there has been disclosed a technique of a liquid crystal display in which transparent electrodes formed on a glass substrate and for liquid crystal display are formed to serve as an antenna so that data can be transmitted to or received from an external device without providing any additional antenna (for example, see JP-A-7-20421 (claim 1, paragraph No. 0008, and FIG. 1)). There has been also disclosed a technique in which a conductive transparent thin film is deposited on a glass so as to form an antenna (for example, see JP-A-8-8628 (paragraph No. 0007, and FIG. 1)).

However, in the conventional technique disclosed in JP-A-7-20421, the transparent electrodes are shaped in a matrix, and the transparent electrodes themselves are formed as an antenna. Accordingly, there is a fear that the intensity of a radio wave from the antenna fluctuates because a driving voltage is selectively applied or not applied to the matrix-shaped transparent electrodes. That is, in some display conditions of the liquid crystal display, data cannot be read from the wireless IC tag. When an antenna is formed on the glass surface of the liquid crystal display in order to avoid such a problem as disclosed in JP-A-8-8628, the size of the liquid crystal display increases depending on the size of the antenna. As a result, the miniaturization of a portable telephone or the like is hindered, and there is a fear that the attraction on design of the portable telephone is spoilt. In addition, when the antenna is pasted onto the back side of the liquid crystal display, the intensity of a radio wave radiated to the surface side is weakened. As a result, data can be read from the wireless IC tag only when the reader is made considerably close to the liquid crystal display. Thus, the user-friendliness deteriorates.

SUMMARY OF THE INVENTION

In consideration of the aforementioned problems, it is an object of the present invention to provide a liquid crystal display mounted with an IC tag in which information of an IC chip can be read from the surface of the liquid crystal display easily, while the IC chip can be attached to the small-size liquid crystal display without reducing the attraction of design thereof, and a method for manufacturing the liquid crystal display.

In order to attain the foregoing object, the present invention provides a liquid crystal display mounted with an IC tag, in which an IC chip for storing information and an antenna for transmitting the information stored in the IC chip wirelessly are mounted on the liquid crystal display, and the antenna is formed to be out of a region of image electrodes formed on a glass substrate of the liquid crystal display.

When the glass substrate on this occasion is composed of a surface-side glass and a back-side glass, the antenna may be formed on the surface-side glass or the back-side glass or may be divided into parts formed on the surface-side glass and the back-side glass respectively.

When the antenna is mounted on one of the glasses and the IC chip is mounted on the other of the glasses, a terminal of the IC chip may be connected to the antenna through an anisotropic conductive material.

A concave portion may be formed in the surface-side glass or the back-side glass so that the IC chip can be mounted to be placed in the concave portion.

When a flexible cable is connected to the glass substrate, a part of the antenna may be formed in the flexible cable.

Further, when a light reflector is mounted on the liquid crystal display, the terminal of the IC chip may be connected to the light reflector so that the light reflector can serve as an antenna.

According to the liquid crystal display mounted with an IC tag according to the present invention, the antenna placed out of the region of the image electrodes formed on the glass substrate of the liquid crystal display constitutes a wireless IC tag. Accordingly, an image is disturbed less due to the influence of the antenna on the image electrodes, and transmitted radio waves are disturbed less due to the influence of the image electrodes on the antenna. Further, unlike the related art, the antenna length is not restricted by the region of the image electrodes as is in the related art, but the antenna length can be increased. It is therefore possible to enhance the intensity of radio waves from the antenna. In addition, the antenna is formed to be out of the region of the image electrodes, that is, outside the region of available pixels. Accordingly, there is no fear that the size of the liquid crystal display increases. Consequently, it is possible to secure the miniaturization of a portable telephone or the like.

BRIEF DESCRIPTION OF THE DRAWINGS

FIG. 1 is a sectional view showing the structure of a transmission-type TFT-LCD to be applied to a liquid crystal display mounted with an IC tag according to the present invention;

DESCRIPTION OF THE EMBODIMENTS

Figure 2A:
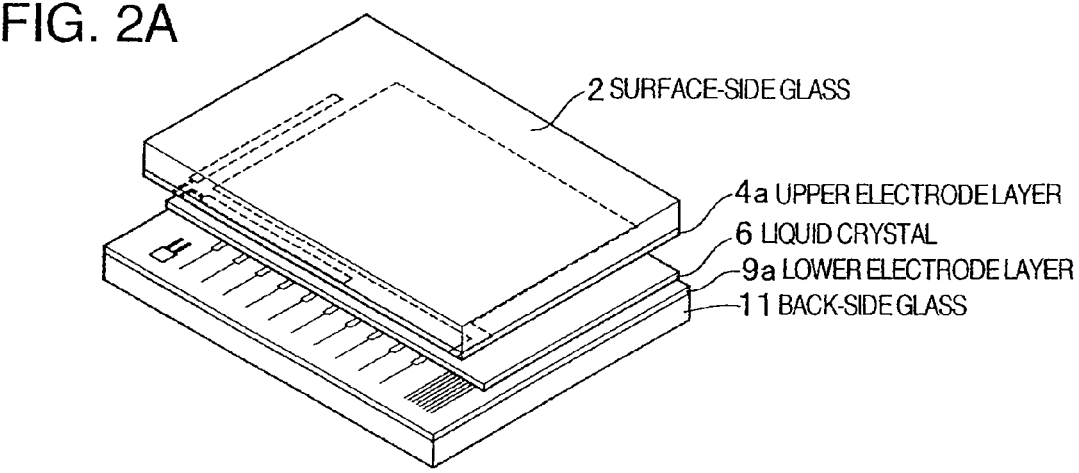
FIGS. 2A-2D are conceptual diagrams of Variation 1 in Embodiment 1 of the present invention in which a wireless IC tag is mounted on an active matrix type liquid crystal display, FIG. 2A showing a laminated configuration of the liquid crystal display, FIG. 2B showing an upper electrode layer, FIG. 2C showing a partial section taken on line A-A in FIG. 2B, FIG. 2D showing a lower electrode layer.

Some preferred embodiments of liquid crystal displays having IC tags according to the invention will be described below in detail with reference to the drawings. In the drawings used for the embodiments which will be described below, constituent parts in one drawing the same as those in another drawing are denoted by the same reference numerals correspondingly.

Outline of the Invention

First, description will be made about the outline of a liquid crystal display mounted with an IC tag according to the invention. In the liquid crystal display mounted with an IC tag according to the invention, an antenna for forming a wireless IC tag is formed in a region having no available pixel in a control transparent electrode layer (hereinafter referred to as "ITO electrode layer" or "transparent electrode layer") in the liquid crystal display, where ITO stands for Indium Tin Oxide. In this event, of two upper and lower ITO electrode layers, only the upper layer, only the lower layer or both the upper and lower layers are used as the region where the antenna should be formed. On the other hand, the position where an IC chip should be mounted is set on a glass substrate provided with ITO electrodes. Further, a part of the antenna (that is, a radio wave radiation portion) may be formed on the glass substrate provided with the ITO electro layers, while the other portion of the antenna is formed on a flexible cable to be connected as signal lines.

That is, in the present invention, in the step of forming the ITO electrodes which are constituent parts of the liquid crystal display, an antenna is formed in an extra region on the periphery of the ITO electrodes. Alternatively, an antenna is formed in an extra region on the peripheries of the ITO electrode layers at the same time as the step of forming matrix wirings of display control transistors. Thus, a desired wireless IC tag can be mounted on the liquid crystal display without adding another step of forming the antenna and without allowing the antenna to intrude the region of available pixels. It is therefore possible to secure miniaturization and design attraction of a portable telephone or the like sufficiently.

When the liquid crystal display has a light reflector, the light reflector may be used as an antenna serving as a radio wave radiation portion. As a result, it is not necessary at all to prepare any antenna formation portion in the region of the ITO electrode layers in the liquid crystal display. Thus, an existing liquid crystal display can be used as it is. It is, however, necessary only to additionally attach a small IC chip to the glass substrate or the like.

Outline of Liquid Crystal Display

First, description will be made about the outline of a liquid crystal display to be applied to the present invention. Liquid crystal displays are categorized, by their drive systems, into a static drive system in which voltages are applied to electrodes individually so as to make their corresponding segments emit light, and a dynamic drive system in which a voltage is applied to a plurality of segments in a lump so as to make the plurality of segments emit light. Further, the dynamic drive system includes a passive matrix system in which an electric signal is supplied to desired intersections of X- and Y-axes in exact timing so as to make the intersections emit light, and an active matrix system in which thin film transistors are formed in intersections of X- and Y-axes, and the thin film transistors in the intersections are switched rapidly individually so as to make desired ones of the intersections emit light.

In the passive matrix system, X-axis electrodes are built in one electrode layer (for example, upper electrode layer), and Y-axis electrodes are built in the other electrode layer (for example, lower electrode layer). On the other hand, in the active matrix system, a solid pattern serving as a ground is formed in one electrode layer (for example, upper electrode layer), and X-axis electrodes and Y-axis electrodes are built like a matrix in only the other electrode layer (for example, lower electrode layer). The static drive system is mainly used in electronic calculators etc. The passive matrix system in the dynamic drive system is mainly used for still pictures in personal computers etc., and the active matrix system is mainly used for high-quality motion pictures in television etc. The techniques about the liquid crystal display are known well, and they are out of the scope of the present invention. Therefore, the techniques about the liquid crystal display will not be described more in detail.

Any one of the aforementioned systems can be applied to the liquid crystal display mounted with an IC tag according to the present invention. In the following embodiments, description will be made about the active matrix system in which high-quality motion pictures etc. can be obtained in the dynamic drive system, the passive matrix system in which still pictures etc. can be obtained in the dynamic drive system, and the static drive system. A transmission type TFT-LCD (transmission type thin film transistor-liquid crystal display) using transparent electrodes is typical as the active matrix type liquid crystal display. Thus, a liquid crystal display in which a wireless IC tag is mounted on a transmission TFT-LCD will be described by way of example.

FIG. 1 is a sectional view showing the structure of a transmission type TFT-LCD to be applied to the liquid crystal display mounted with an IC tag thereon according to the present invention. The upper portion in FIG. 1 is the surface side of the liquid crystal display, and the lower portion is the back side thereof. The transmission type TFT-LCD has a surface-side polarizing plate 1, a surface-side glass 2, a color filter 3, surface-side ITO electrodes 4, a surface-side orientation film 5, a liquid crystal 6, a sealant 7, a back-side orientation film 8, back-side ITO electrodes 9, transistors 10, a back-side glass 11, a back-side polarizing plate 12, spacers 13, a backlight 14, and a light reflector 15 in order of increasing distance from the surface. The spacers 13 define the distance between the surface-side glass 2 and the back-side glass 11. The configuration and operation of the transmission type TFT-LCD configured thus is based on well-known techniques. Therefore, more description will be omitted.

In the liquid crystal display having an IC tag according to the present invention, an antenna for forming the wireless IC tag is formed in any one of the following three sites. That is, an antenna is formed in any one of a layer for forming the surface-side ITO electrodes 4, a layer for forming the back-side ITO electrodes 9, and a layer for forming pattern wirings of the transistors 10, in the step of forming the ITO electrodes or the pattern wirings. The position where the IC chip is mounted is set as follows. That is, when the antenna is built in the layer where the surface-side ITO electrodes 4 are formed, the IC chip is mounted on the surface-side glass 2 or the layer where the surface-side ITO electrodes 4 are formed. On the other hand, when the antenna is built in the layer where the back-side ITO electrodes 9 are formed or the layer where the pattern wirings of the transistors 10 are formed, the IC chip is mounted on the back-side glass 11 or the layer where the back-side ITO electrodes 9 are formed. Incidentally, in the embodiments which will be described below, the layer where the surface-side ITO electrodes 4 are formed will be referred to as an "upper electrode layer", and the layer where the back-side ITO electrodes 9 are formed will be referred to as a "lower electrode layer".

Embodiment 1

In Embodiment 1, description will be made about a method for mounting a wireless IC tag, in which an antenna and a wireless IC tag are mounted on an active matrix type liquid crystal display having X-axis electrodes and Y-axis electrodes formed only in a lower electrode layer in a transmission type TFT-LCD shown in FIG. 1. Embodiment 1 has some variations as to the position where the antenna is formed. Of the variations, typical variations will be described.

Figure 2B:
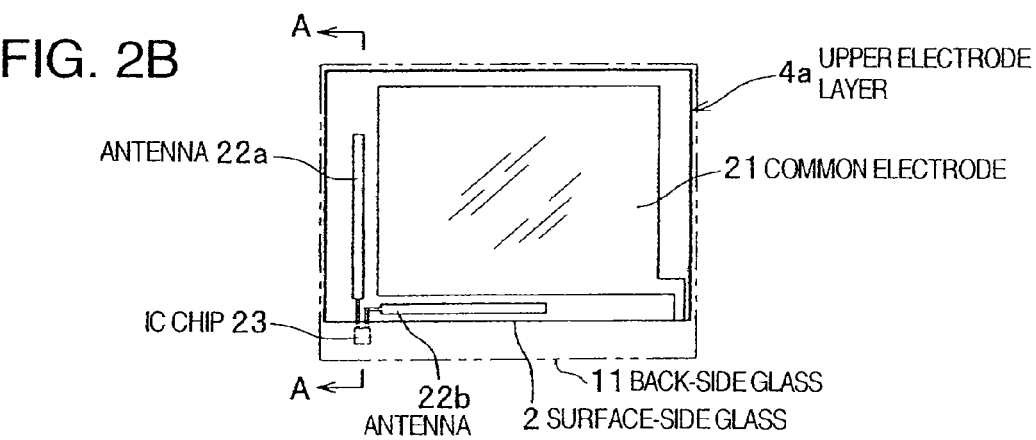
Figure 2C:
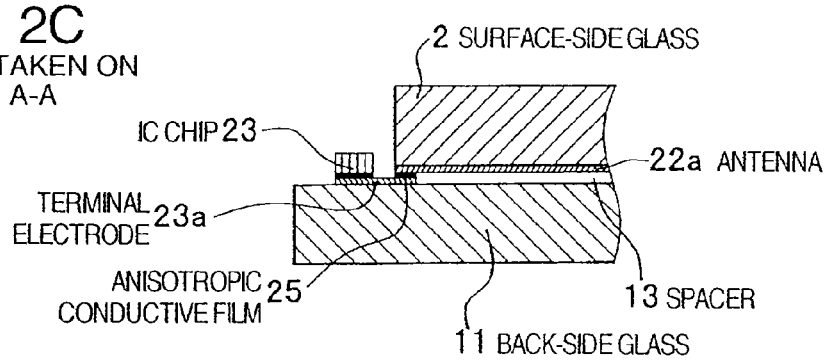
Figure 2D:
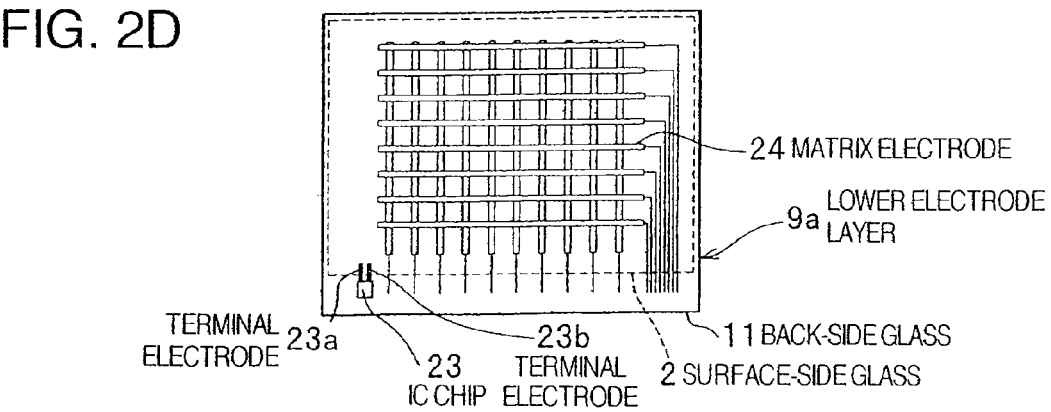

First, description will be made about Variation 1 of Embodiment 1 in which a wireless IC tag is mounted on an active matrix type liquid crystal display. FIGS. 2A-2D are conceptual diagrams of Variation 1 in Embodiment 1 of the present invention in which a wireless IC tag is mounted on an active matrix type liquid crystal display. FIG. 2A shows a laminated configuration of the liquid crystal display. FIG. 2B shows an upper electrode layer. FIG. 2C shows a partial section taken on line A-A in FIG. 2B. FIG. 2D shows a lower electrode layer.

Schematically, as shown in FIG. 2A, the active matrix type liquid crystal display has a configuration in which a surface-side glass 2, an upper electrode layer 4a, a liquid crystal 6, a lower electrode layer 9a and a back-side glass 11 are laminated in that order. In addition, as shown in FIG. 2B, a common electrode 21 is patterned and wired in a wide region of a central portion of the upper electrode layer 4a formed on the surface-side glass 2. Further, an antenna 22a and an antenna 22b are formed in a corner region of the upper electrode layer 4a where the common electrode 21 is not patterned and wired.

Each of the antennas 22a and 22b has an electric length of $\lambda/2$, where $\lambda$ designates not the wavelength of a radio wave in a vacuum but the wavelength of a radio wave existing on glass serving as a dielectric. In addition, as shown in FIG. 2D, matrix electrodes (image electrodes) 24 extending in the X-axis and the Y-axis are patterned and wired in a region of the lower electrode layer 9a opposite to the region of the common electrode 21 in the upper electrode layer 4a. Further, terminal electrodes 23a and 23b are formed in positions corresponding to the antennas 22a and 22b respectively. In addition, an IC chip 23 is fixed through an anisotropic conductive film onto the terminal electrodes 23a and 23b, that is, out of the region of the surface-side glass 2 shown by the broken line. Two electrodes of the IC chip 23 are connected to the terminal electrodes 23a and 23b through the anisotropic conductive film respectively. The IC chip 23 is connected to the antennas 22a and 22b through the terminal electrodes 23a and 23b respectively.

Next, the attachment configuration between each antenna 22a, 22b and the IC chip 23 in the wireless IC tag will be described more in detail with reference to FIG. 2C which is a sectional view taken on line A-A in FIG. 2B. On the back of the surface-side glass 2, the antenna 22a is formed as a thin film by vapor deposition of, for example, a mixture (ITO) of indium oxide and tin oxide, or the like, in the same step as the upper electrode layer 4a is formed.

On the other hand, on the surface of the back-side glass 11, the IC chip 23 is surface-mounted out of the region of the surface-side glass 2 so as to put the terminal electrodes 23a and 23b between the back-side glass 11 and the IC chip 23. The terminal electrodes 23a and 23b are connected to the antennas 22a and 22b through the anisotropic conductive film 25 respectively. The anisotropic conductive film 25 can be made of a polymeric thermo-compression or adhesive material which will exhibit high conductivity in a direction if thermo-compression bonding is applied to the polymeric material. Thus, the IC chip can be fixedly attached at the same time as the lead wires of the IC chip are connected.

In Variation 1 of Embodiment 1 of the present invention, the antennas 22a and 22b and the IC chip 23 for forming the wireless IC tag are mounted out of the pixel region of the liquid crystal display according to the aforementioned method. Accordingly, there is no fear that the wireless IC tag mounted on the liquid crystal display having a small area disturbs image display, and there is no fear that the wireless IC tag spoils the attraction on design of the liquid crystal display. In addition, a comparatively long antenna can be formed along a region out of the pixel region in the upper electrode layer 4a where the surface-side transparent electrodes are formed. Accordingly, the intensity of a radio wave from the antenna can be enhanced so that good directivity can be obtained.

Figure 3A:
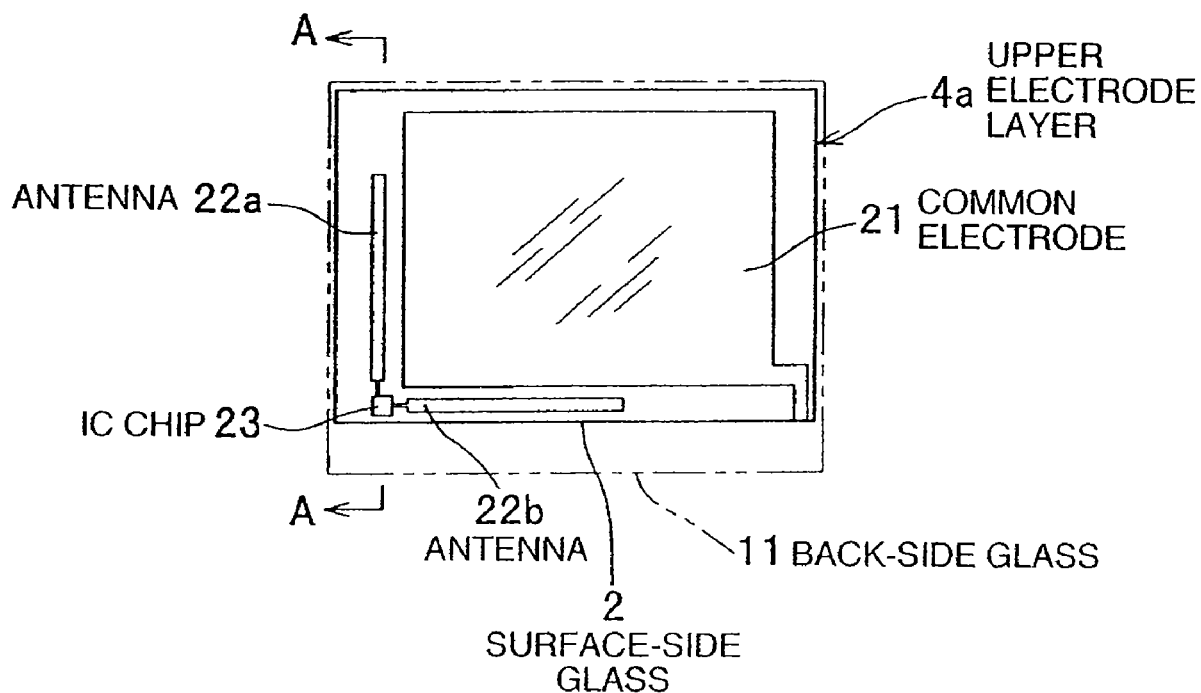
FIGS. 3A-3B are conceptual diagrams of Variation 2 in Embodiment 1 of the present invention in which a wireless IC tag is mounted on an active matrix type liquid crystal display, FIG. 3A showing an upper electrode layer, FIG. 3B showing a partial section taken on line A-A in FIG. 3A.
Figure 3B:
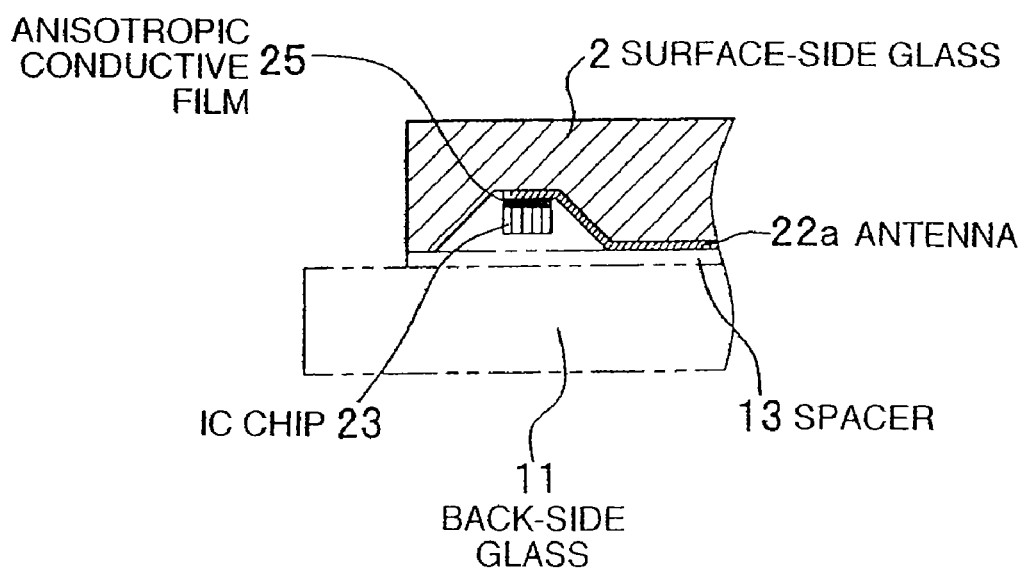

Next, description will be made about Variation 2 of Embodiment 1 in which a wireless IC tag is mounted on an active matrix type liquid crystal display. FIGS. 3A-3B are conceptual diagrams of Variation 2 in Embodiment 1 of the present invention in which a wireless IC tag is mounted on an active matrix type liquid crystal display. FIG. 3A shows an upper electrode layer, and FIG. 3B shows a partial section taken on line A-A in FIG. 3A. Incidentally, the laminated configuration of the liquid crystal display and the back-side glass 11 are the same as those in FIGS. 2A and 2D, and they are not required when Variation 2 of Embodiment 1 is explained. Therefore, their diagrams are omitted from FIGS. 3A and 3B.

The arrangement configuration of the wireless IC tag in Variation 2 shown in FIGS. 3A-3B is different from that in Variation 1 shown in FIGS. 2A-2D in that not only the antennas 22a and 22b but also the IC chip 23 are included in the region of the surface-side glass 2. That is, as shown in FIG. 3A, the common electrode (image electrode) 21 is patterned and wired in a wide area of a central portion of the upper electrode layer 4a, while the antennas 22a and 22b are formed in a corner region where the common electrode 21 is not patterned and wired, and the IC chip 23 is mounted in the same corner region. Two terminals of the IC chip 23 are connected to the antennas 22a and 22b respectively. Each of the antennas 22a and 22b has an electric length of $\lambda/2$.

Next, the attachment configuration between each antenna and the IC chip in the wireless IC tag will be described more in detail with reference to FIG. 3B which is a sectional view taken on line A-A in FIG. 3A. A concave portion deep enough to place the IC chip 23, for example, about 50-250 □m deep is formed near an end portion of the surface-side glass 2. The antenna 22 preferably includes a slant portion to prevent the antennas 22a and 22b from being broken at a position of right or acute angles. In the same step as the common electrode 21 is formed, the antenna 22a is formed as a thin film on the back of the surface-side glass 2 including the concave portion.

An anisotropic conductive film 25 is provided into the concave portion of the surface-side glass 2 formed thus and near the antenna 22a. After that, the IC chip 23 is placed in the concave portion, and thermo-compression bonding is applied thereto. As a result, one terminal of the IC chip 23 is connected to the antenna 22a through the anisotropic conductive film 25. On the other hand, though not shown in FIG. 3B, the other terminal of the IC chip 23 is connected to the antenna 22b through the anisotropic conductive film 25 likewise. In this event, since the IC chip 23 has been placed within the depth of the concave portion of the surface-side glass 2, the surface-side glass 2 and the back-side glass 11 can come into close contact with each other without being disturbed by the IC chip 23.

In Variation 2 of Embodiment 1 of the present invention, the antennas 22a and 22b and the IC chip 23 for forming the wireless IC tag are mounted out of the pixel region of the liquid crystal display according to the aforementioned method. Accordingly, the wireless IC tag mounted on the liquid crystal display having a small area disturbs image display less, and the wireless IC tag spoils less the attraction on design of the liquid crystal display. In addition, a comparatively long antenna can be formed along a region out of the pixel region in the upper electrode layer 4a where the surface-side transparent electrodes are formed. Accordingly, the intensity of a radio wave from the antenna can be enhanced so that good directivity can be obtained.

Figure 4A:
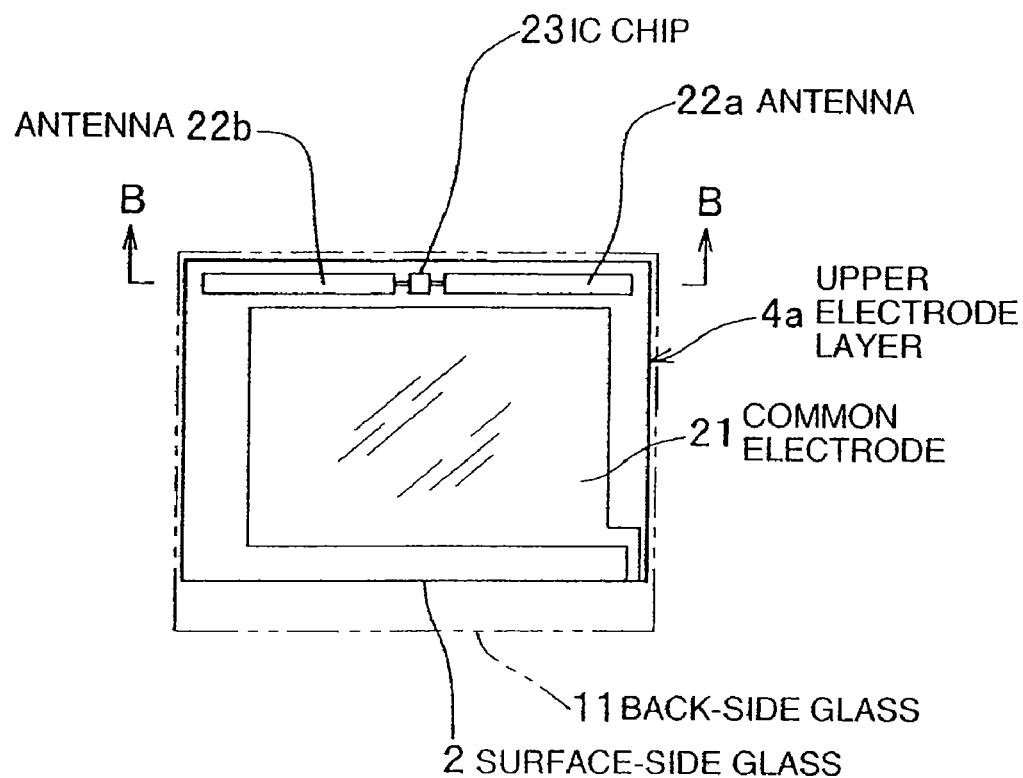
FIGS. 4A-4B are conceptual diagrams of Variation 3 in Embodiment 1 of the present invention in which a wireless IC tag is mounted on an active matrix type liquid crystal display, FIG. 4A showing an upper electrode layer, FIG. 4B showing a partial section taken on line B-B in FIG. 4A.
Figure 4B:
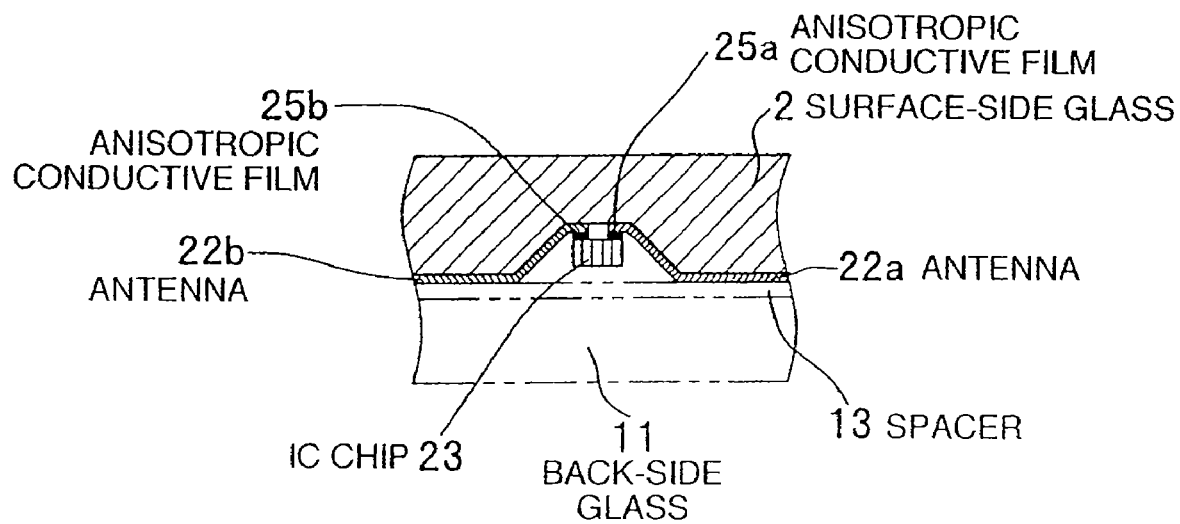

Next, description will be made about Variation 3 of Embodiment 1 in which a wireless IC tag is mounted on an active matrix type liquid crystal display. FIGS. 4A-4B are conceptual diagrams of Variation 3 in Embodiment 1 of the present invention in which a wireless IC tag is mounted on an active matrix type liquid crystal display. FIG. 4A shows an upper electrode layer, and FIG. 4B shows a partial section taken on line B-B in FIG. 4A. Incidentally, the laminated configuration of the liquid crystal display and the lower electrode layer are the same as those in FIGS. 2A and 2D, and they are required when Variation 3 of Embodiment 1 is explained. Therefore, their diagrams are omitted here.

The arrangement configuration of the wireless IC tag in Variation 3 shown in FIGS. 4A-4B is different from that in Variation 2 shown in FIGS. 3A-3B in that the antennas 22a and 22b and the IC chip 23 are disposed not in a corner portion of the upper electrode layer 4a but along one edge (upper edge in FIG. 4A) of a region where the common electrode 21 is not patterned and wired, as shown in FIG. 4A. Also in this case, in the same manner as in Variation 2 described above, one terminal of the IC chip 23 is connected to the antenna 22a, while the other terminal of the IC chip 23 is connected to the antenna 22b, and each of the antennas 22a and 22b has an electric length of $\lambda/2$.

In addition, as shown in FIG. 4B, the IC chip 23 is placed in a concave portion of the surface-side glass 2 in the same manner as in Variation 2 shown in FIGS. 3A-3B, and one terminal of the IC chip 23 is connected to the terminal portion of the antenna 22a through an anisotropic conductive film 25a, while the other terminal of the IC chip 23 is connected to the terminal portion of the antenna 22b through an anisotropic conductive film 25b likewise. Thus, the wireless IC tag mounted on the liquid crystal display having a small area disturbs image display less, and the wireless IC tag spoils less the attraction on design of the liquid crystal display. In addition, a comparatively long antenna can be formed along a region out of the pixel region in the upper electrode layer 4a where the surface-side transparent electrodes are formed. Accordingly, the intensity of a radio wave from the antenna can be enhanced so that good directivity can be obtained.

Figure 5A:
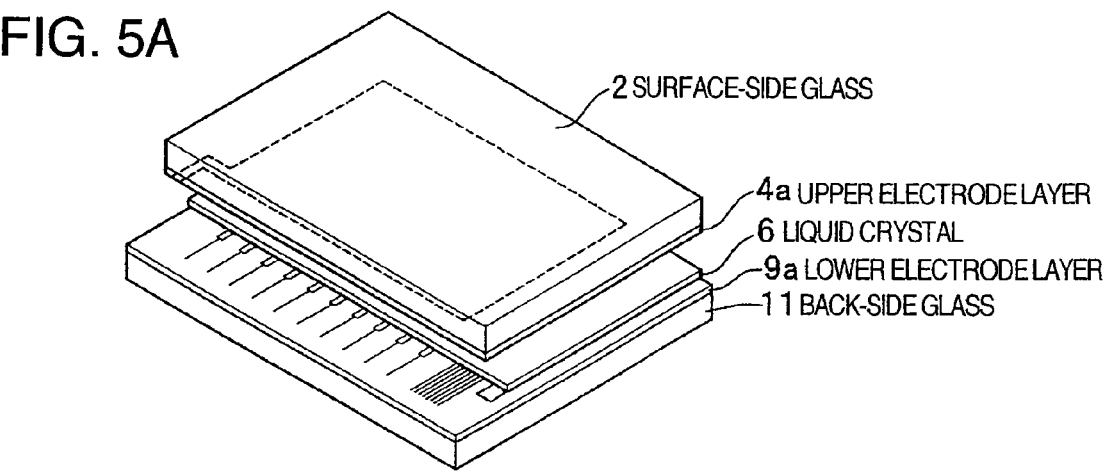
FIGS. 5A-5D are conceptual diagrams of Variation 4 in Embodiment 1 of the present invention in which a wireless IC tag is mounted on an active matrix type liquid crystal display, FIG. 5A showing a laminated configuration of the liquid crystal display, FIG. 5B showing an upper electrode layer, FIG. 5C showing a partial section taken on line C-C in FIG. 5D, FIG. 5D showing a lower electrode layer.
Figure 5B:
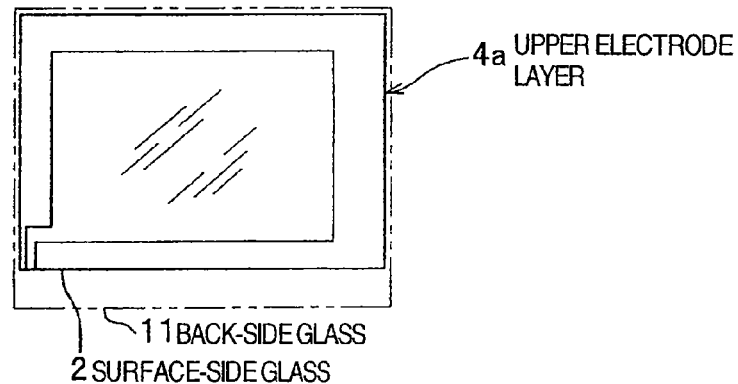
Figure 5C:
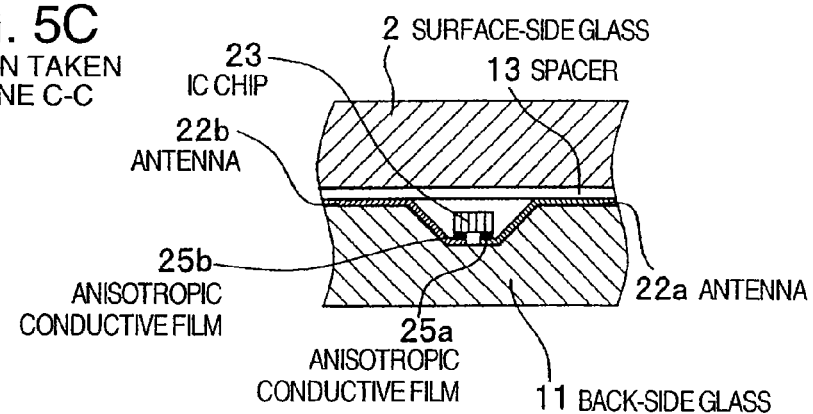
Figure 5D:
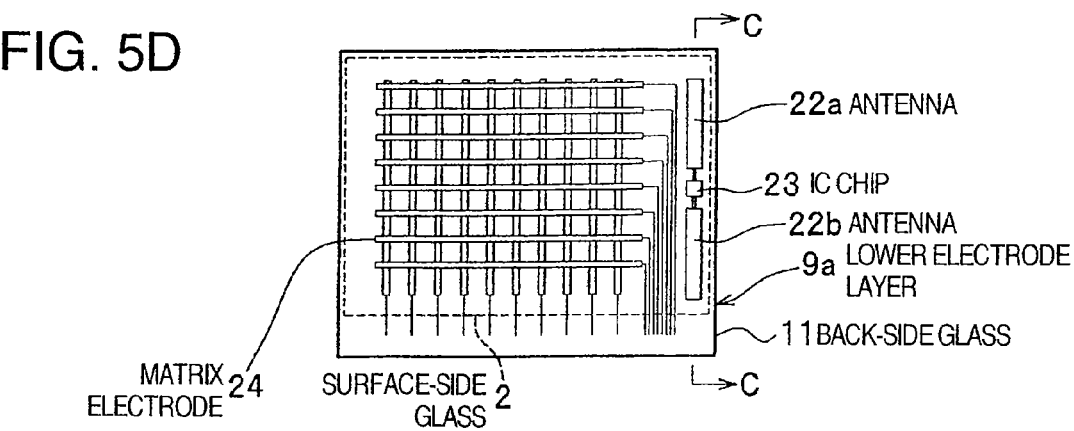

Next, description will be made about Variation 4 of Embodiment 1 in which a wireless IC tag is mounted on an active matrix type liquid crystal display. FIGS. 5A-5D are conceptual diagrams of Variation 4 in Embodiment 1 of the present invention in which a wireless IC tag is mounted on an active matrix type liquid crystal display. FIG. 5A shows a laminated configuration of the liquid crystal display. FIG. 5B shows an upper electrode layer. FIG. 5C shows a partial section taken on line C-C in FIG. 5D. FIG. 5D shows a back-side glass. In Variation 4, description will be made on the case where the antennas and the IC chip are mounted on the back-side glass 11.

Also in Variation 4, the liquid crystal display has a configuration in which a surface-side glass 2, an upper electrode layer 4a, a liquid crystal 6, a lower electrode layer 9a and a back-side glass 11 are laminated in that order, as shown in FIG. 5A. In addition, as shown in FIG. 5C, matrix electrodes 24 extending in the X-axis and the Y-axis are patterned and wired in the lower electrode layer 9a on the back-side glass 11. Further, an antenna 22a and an antenna 22b are formed in a right edge portion of the lower electrode layer 9a where the matrix electrodes 24 are not patterned and wired. An IC chip 23 is also mounted in the right edge portion. Two terminals of the IC chip 23 are connected to the antennas 22a and 22b through anisotropic conductive films 25a and 25b respectively. Each of the antennas 22a and 22b has an electric length of λ/2. According to another method for forming the antennas 22a and 22b, the antennas 22a and 22b may be formed not in the step of forming transparent electrodes but in the step of forming transistors for controlling respective pixels. For example, the antennas 22a and 22b can be formed at the same time as aluminum wirings are formed in the step of forming TFTs (Thin Film Transistors).

Next, the attachment configuration between each antenna and the IC chip in the wireless IC tag will be described more in detail with reference to FIG. 5C which is a sectional view taken on line C-C in FIG. 5D. A concave portion which is deep enough to place the IC chip 23 and which has a slant between the surface and the bottom of the concave is formed in the back-side glass 11. In the same step as the lower electrode layer 9a is formed, the antennas 22a and 22b are formed as thin films on the surface of the back-side glass 11 including the concave portion. Anisotropic conductive films 25a and 25b are charged into the concave portion of the back-side glass 11 formed thus. After that, the IC chip 23 is placed in the concave portion, and thermo-compression bonding is applied thereto. As a result, terminals of the IC chip 23 are connected to terminal portions of the antennas 22a and 22b through the anisotropic conductive films 25a and 25b. In this event, since the IC chip 23 has been placed within the depth of the concave portion of the back-side glass 11, the surface-side glass 2 and the back-side glass 11 can come into close contact with each other without being disturbed by the IC chip 23.

Figure 6A:
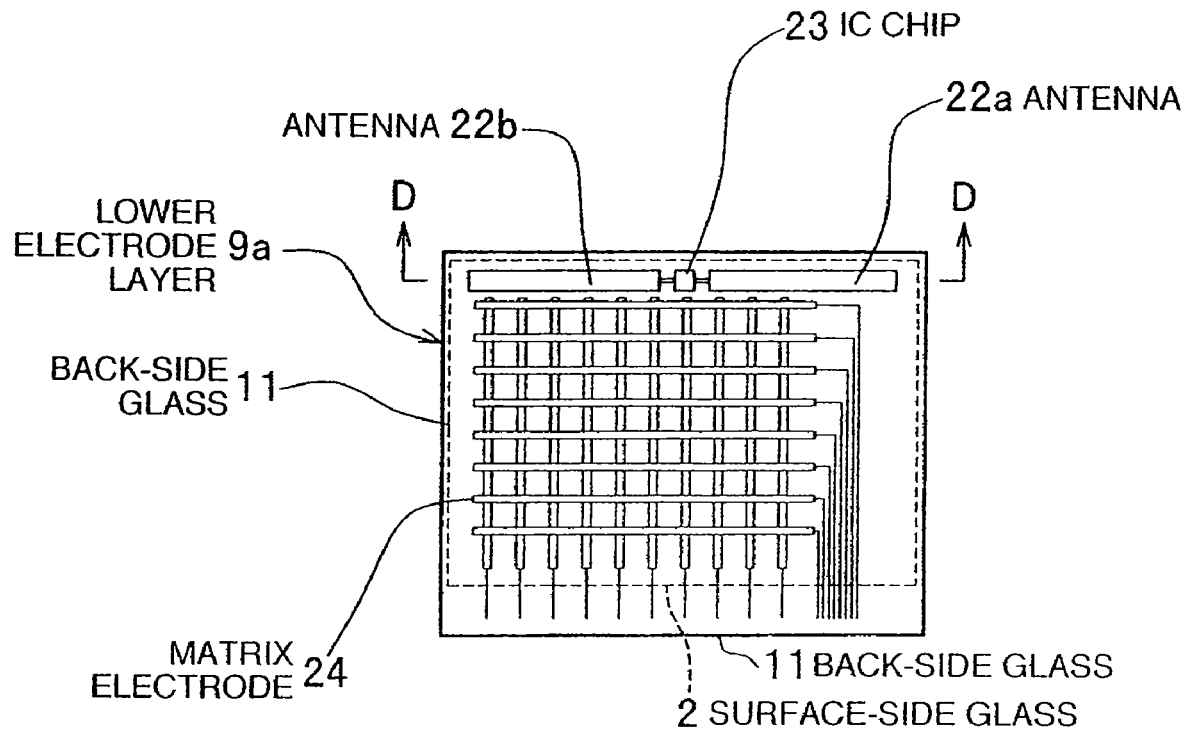
FIGS. 6A-6B are conceptual diagrams of Variation 5 in Embodiment 1 of the present invention in which a wireless IC tag is mounted on an active matrix type liquid crystal display, FIG. 6A showing a lower electrode layer, FIG. 6B showing a sectional view taken on line D-D in FIG. 6A.
Figure 6B:
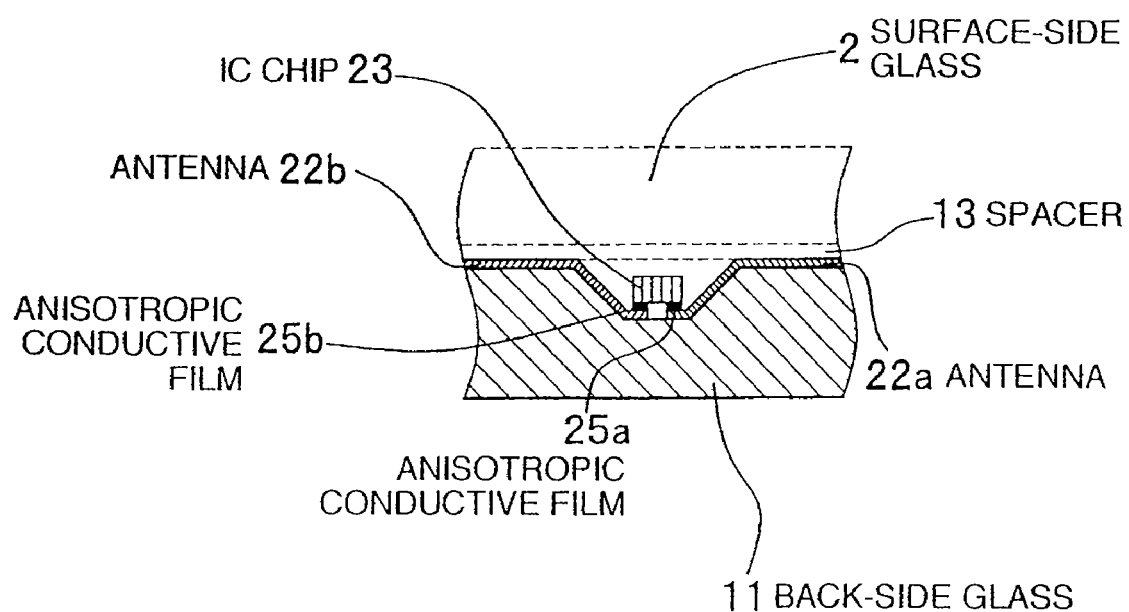

Next, description will be made about Variation 5 of Embodiment 1 in which a wireless IC tag is mounted on an active matrix type liquid crystal display. FIGS. 6A-6B are conceptual diagrams of Variation 5 in Embodiment 1 of the present invention in which a wireless IC tag is mounted on an active matrix type liquid crystal display. FIG. 6A shows a lower electrode layer, and FIG. 6B shows a sectional view taken on line D-D in FIG. 6A. Variation 5 shown in FIGS. 6A-6B is different from Variation 4 shown in FIGS. 5A-5D only in that the position where the antennas 22a and 22b and the IC chip 23 are disposed is changed from a Y-axis end face of the lower electrode layer 9a to an X-axis end face thereof. As a result, it is possible to make the antennas 22a and 22b longer than those in Variation 4 shown in FIGS. 5A-5D. Also in Variation 5 shown in FIGS. 6A-6B, in the same manner as in Variation 4 shown in FIGS. 5A-5D, the antennas 22a and 22b and the IC chip 23 are included in the region of the back-side glass 11, and the IC chip 23 is placed in the concave portion of the back-side glass 11. Accordingly, the configuration of FIG. 6A is quite the same as the configuration of FIG. 5D, and its description will be omitted here. Incidentally, also in Variation 5 shown in FIGS. 6A-6B, the antennas 22a and 22b can be formed at the same time as aluminum wirings are formed.

Figure 7A:
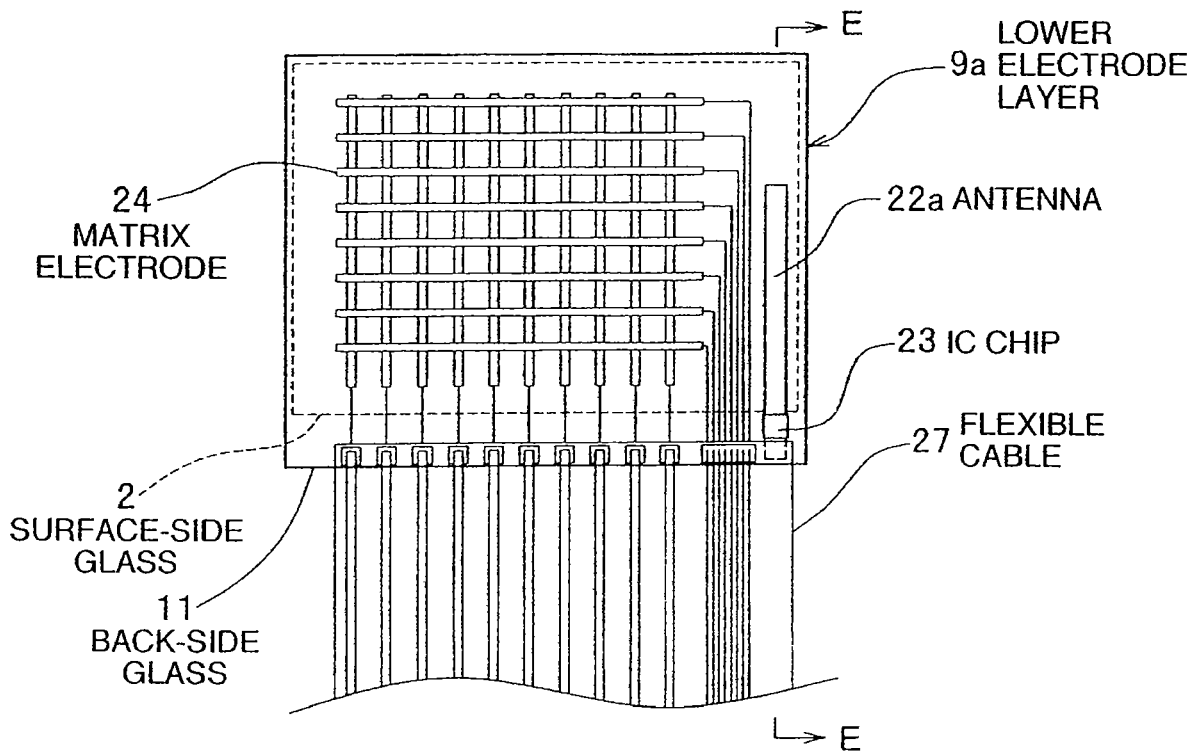
FIGS. 7A-7B are conceptual diagrams of Variation 6 in Embodiment 1 of the present invention in which a wireless IC tag is mounted on an active matrix type liquid crystal display, FIG. 7A showing a lower electrode layer, FIG. 7B showing a sectional view taken on line E-E in FIG. 7A.
Figure 7B:
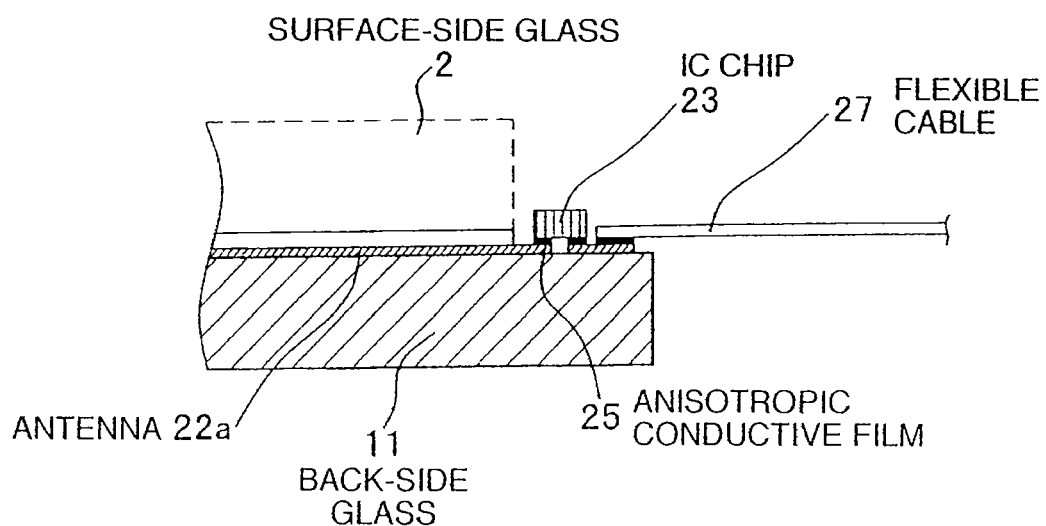

Next, description will be made about Variation 6 of Embodiment 1 in which a wireless IC tag is mounted on an active matrix type liquid crystal display. FIGS. 7A-7B are conceptual diagrams of Variation 6 in Embodiment 1 of the present invention in which a wireless IC tag is mounted on an active matrix type liquid crystal display. FIG. 7A shows a lower electrode layer, and FIG. 7B shows a sectional view taken on line E-E in FIG. 7A. In Variation 6, only the antenna 22a having an electric length of λ/4 is formed on the lower electrode layer 9a together with the IC chip 23.

That is, Variation 6 has a mode in which a flexible cable 27 is connected to the lower electrode layer 9a as shown in FIG. 7A. The antenna 22a is formed out of the region of the matrix electrodes 24 in the lower electrode layer 9a where the matrix electrodes 24 are formed, and within the region of the surface-side glass 2. On the other hand, the IC chip 23 is mounted out of the region of the surface-side glass 2. The antenna in this case is constituted by only the antenna 22a formed in the lower electrode layer 9a and having an electric length of λ/4. In addition, as shown in FIG. 7B, the IC chip 23 is mounted on the lower electrode layer 9a, and one terminal of the IC chip 23 is connected through the anisotropic conductive film 25 to the antenna 22a formed on the back-side glass 11. Although the IC chip 23 is mounted on the lower electrode layer 9a in FIG. 7A, the IC chip 23 may be mounted on the flexible cable 27.

Figure 8A:
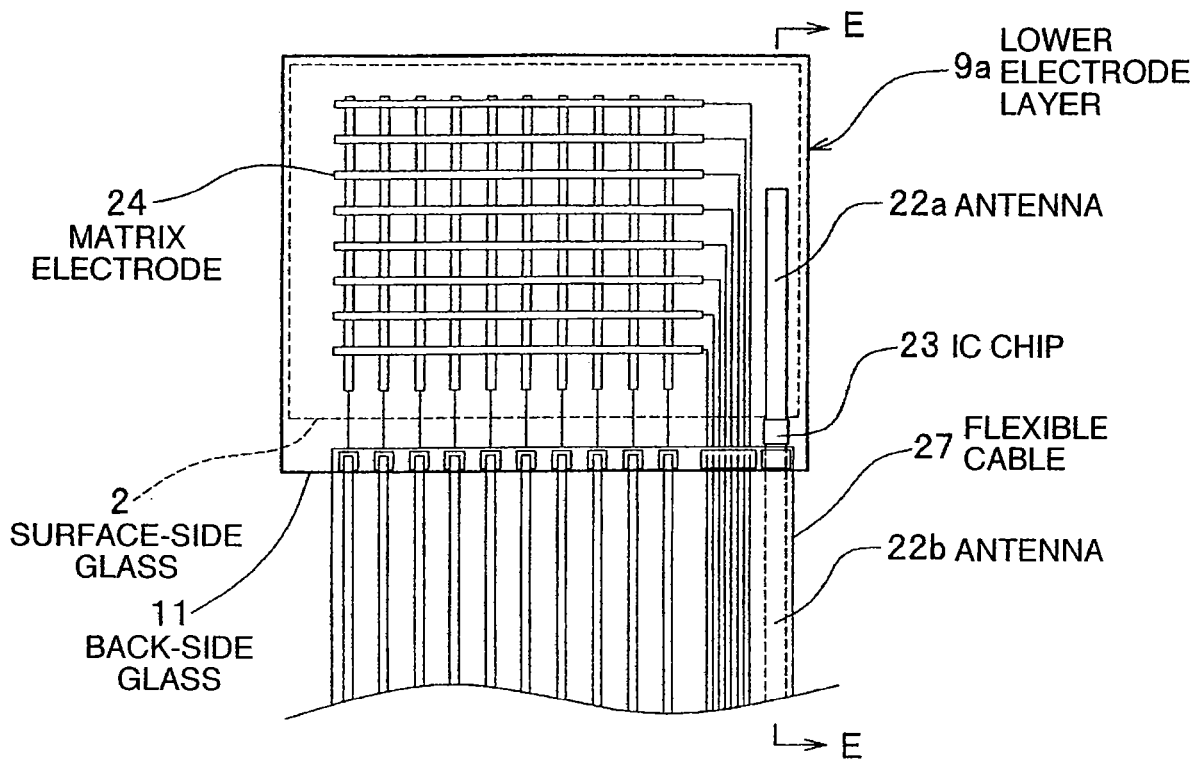
FIGS. 8A-8B are conceptual diagrams of Variation 7 in Embodiment 1 of the present invention in which a wireless IC tag is mounted on an active matrix type liquid crystal display, FIG. 8A showing a lower electrode layer and a flexible cable, FIG. 8B showing a sectional view taken on line E-E in FIG. 8A.
Figure 8B:
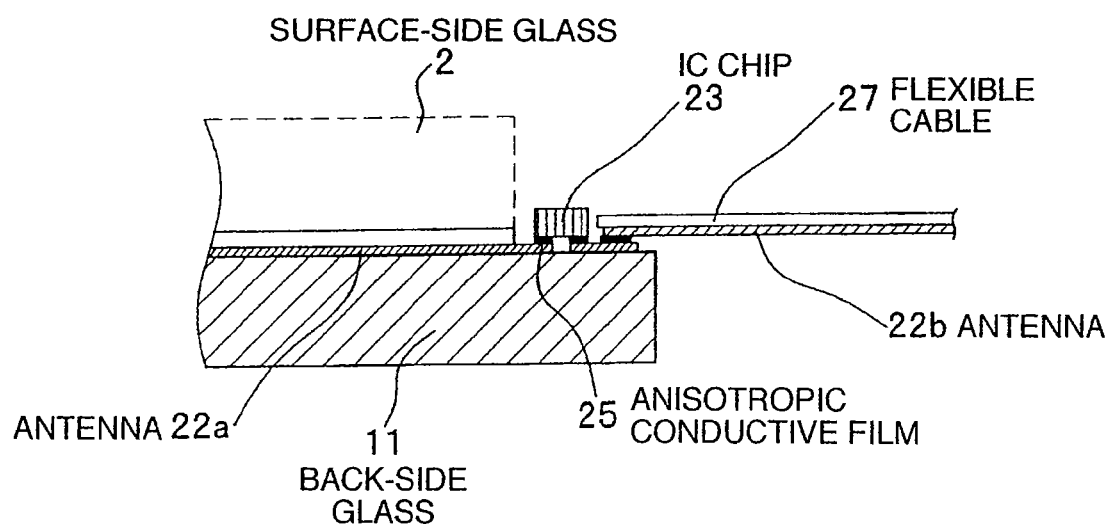

Next, description will be made about Variation 7 of Embodiment 1 in which a wireless IC tag is mounted on an active matrix type liquid crystal display. FIGS. 8A-8B are conceptual diagrams of Variation 7 in Embodiment 1 of the present invention in which a wireless IC tag is mounted on an active matrix type liquid crystal display. FIG. 8A shows a lower electrode layer and a flexible cable, and FIG. 8B shows a sectional view taken on line E-E in FIG. 8A.

Variation 7 has a mode in which a flexible cable 27 is connected to the lower electrode layer 9a, as shown in FIG. 8A. An antenna 22a and an IC chip 23 are disposed on the lower electrode layer 9a where the matrix electrodes 24 are formed. An antenna 22b is disposed on the flexible cable 27. The IC chip 23 is mounted out of the region of the surface-side glass 2 in the back-side glass 11. Accordingly, as shown in FIG. 8B, the antenna 22a formed on the lower electrode layer 9a and the antenna 22b formed on the flexible cable 27 are connected through an anisotropic conductive film 25.

Further, when a desired distance (e.g. 0.2-1.0 mm) is set between each antenna and each transparent electrode, the transparent electrode serves as an additional antenna so that the radio wave intensity can be further enhanced. As a result, the receiving sensitivity of the reader is enhanced so that data of the IC chip mounted on the liquid crystal display can be read from a comparatively long distance.

Also in Variation 7 shown in FIGS. 8A-8B, the antennas 22a and 22b can be formed at the same time as aluminum wirings are formed.

Figure 9A:
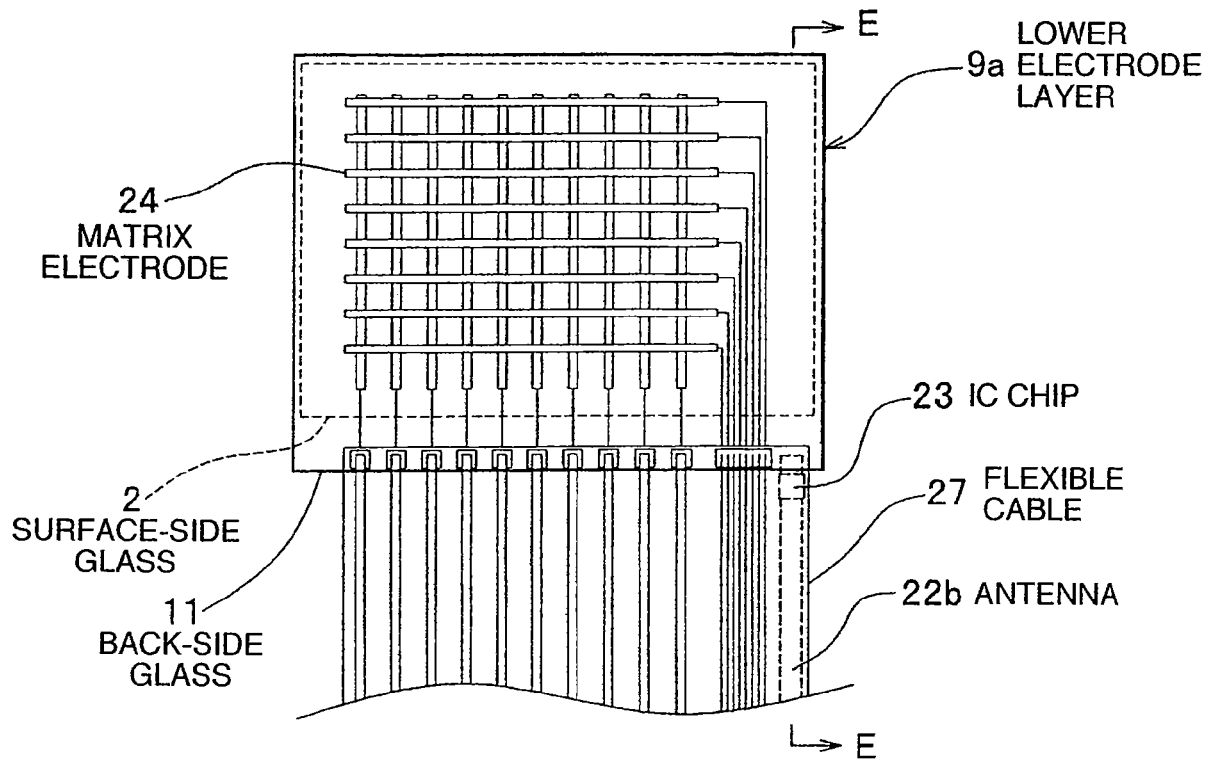
FIGS. 9A-9B are conceptual diagrams of Variation 8 in Embodiment 1 of the present invention in which a wireless IC tag is mounted on an active matrix type liquid crystal display, FIG. 9A showing a lower electrode layer and a flexible cable, FIG. 9B showing a sectional view taken on line E-E in FIG. 9A.
Figure 9B:
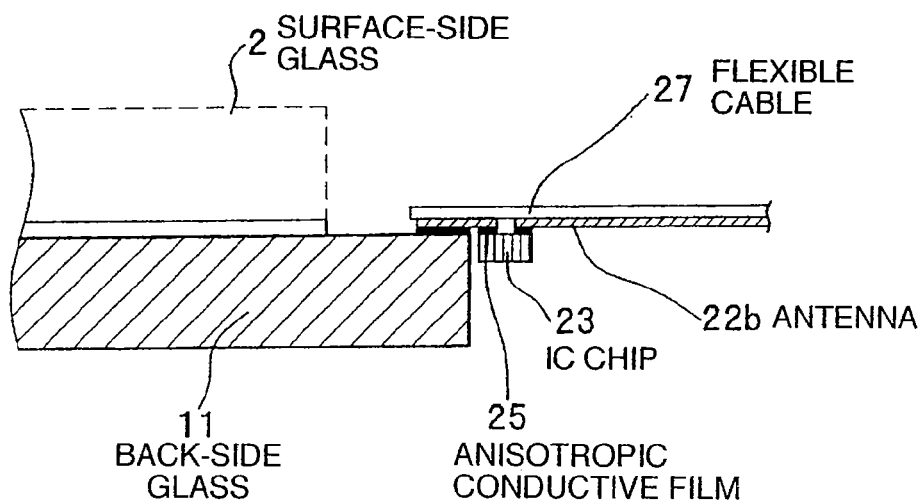

FIGS. 9A-9B are conceptual diagrams of Variation 8 in Embodiment 1 of the present invention in which a wireless IC tag is mounted on an active matrix type liquid crystal display. FIG. 9A shows a lower electrode layer and a flexible cable, and FIG. 9B shows a sectional view taken on line E-E in FIG. 9A. Although the antenna 22a and the IC chip 23 are formed on the lower electrode layer 9a in Variation 6 shown in FIGS. 7A-7B described above, the antenna 22b and the IC chip 23 may be formed on the flexible cable 27 as in Variation 8 shown in FIGS. 9A-9B.

Figure 10A:
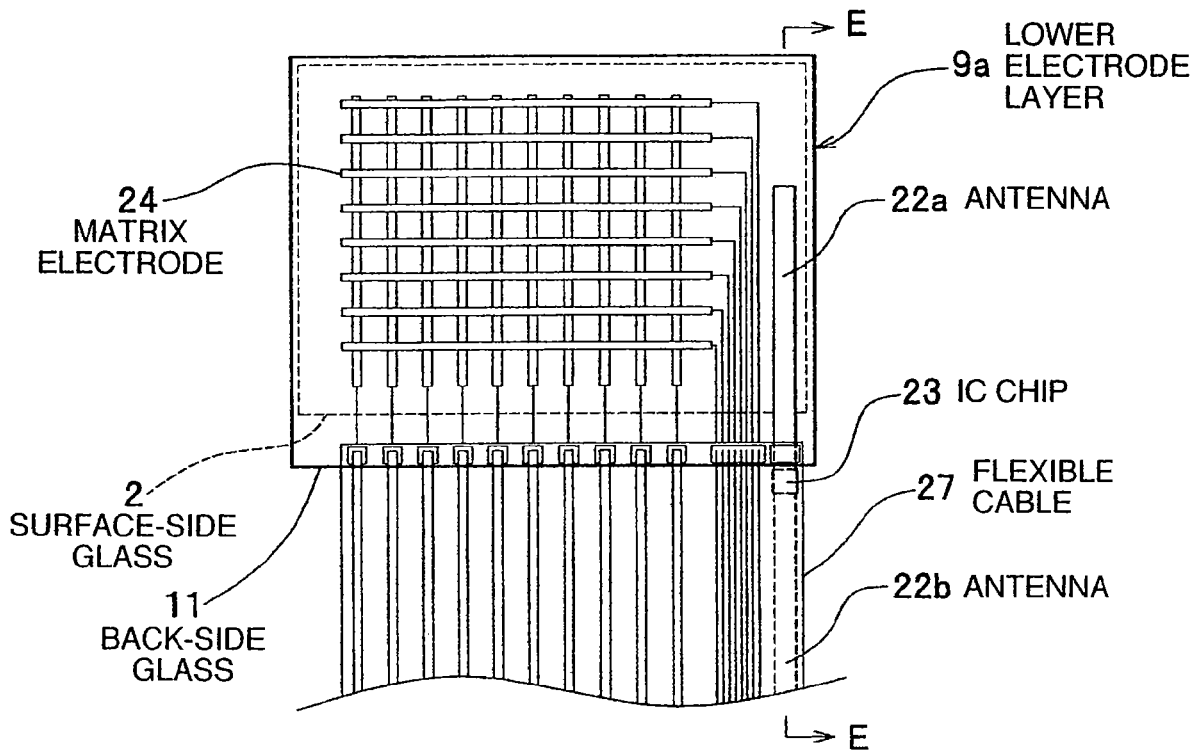
FIGS. 10A-10B are conceptual diagrams of Variation 9 in Embodiment 1 of the present invention in which a wireless IC tag is mounted on an active matrix type liquid crystal display, FIG. 10A showing a lower electrode layer and a flexible cable, FIG. 10B showing a sectional view taken on line E-E in FIG. 10A.
Figure 10B:
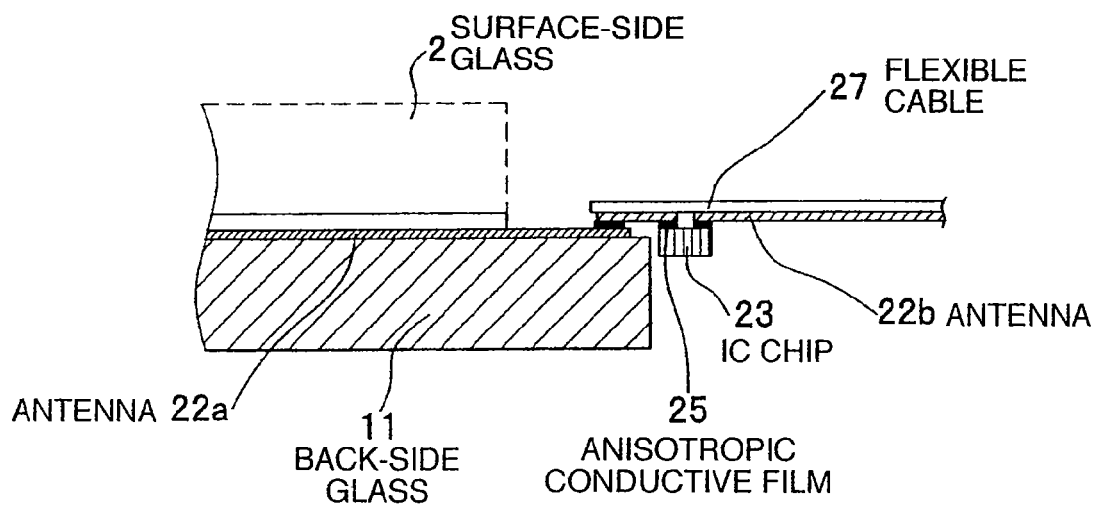

FIGS. 10A-10B are conceptual diagrams of Variation 9 in Embodiment 1 of the present invention in which a wireless IC tag is mounted on an active matrix type liquid crystal display. FIG. 10A shows a lower electrode layer and a flexible cable, and FIG. 10B shows a sectional view taken on line E-E in FIG. 10A. Although the IC chip 23 is formed on the lower electrode layer 9a in Variation 7 shown in FIGS. 8A-8B described above, the IC chip 23 may be mounted on the flexible cable 27 as in Variation 9 shown in FIGS. 10A-10B.

Embodiment 2

In Embodiment 2, description will be made about a method for mounting a wireless IC tag, in which each antenna and an IC chip are mounted on a passive matrix type liquid crystal display having X-axis electrodes formed in an upper electrode layer and Y-axis electrodes formed in a lower electrode layer. Embodiment 2 also has some variations as to the position where the antenna is formed. Of the variations, typical variations will be described here.

Figure 11A:
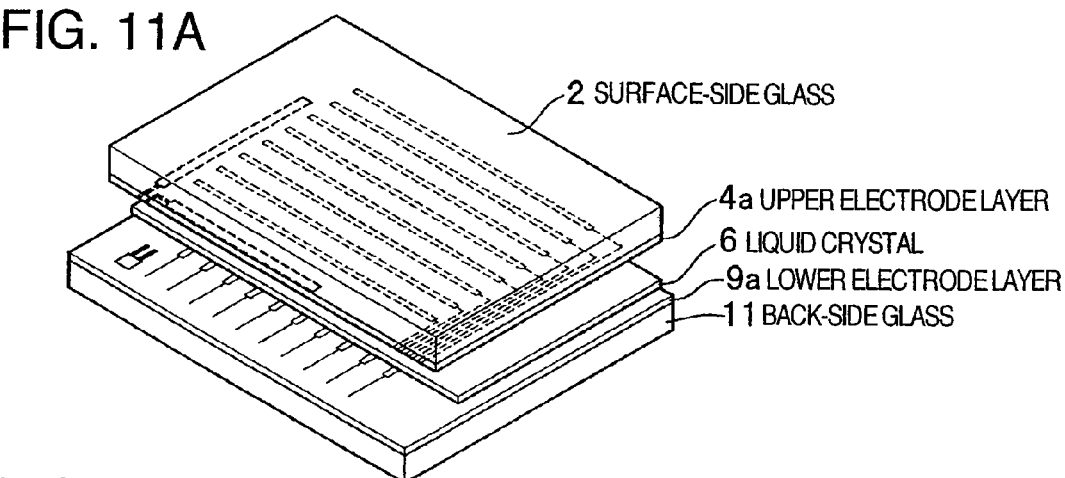
FIGS. 11A-11D are conceptual diagrams of Variation 1 in Embodiment 2 of the present invention in which a wireless IC tag is mounted on a passive matrix type liquid crystal display, FIG. 11A showing a laminated configuration of the liquid crystal display, FIG. 11B showing an upper electrode layer, FIG. 11C showing a partial section taken on line B-B in FIG. 11B, FIG. 11D showing a lower electrode layer.
Figure 11B:
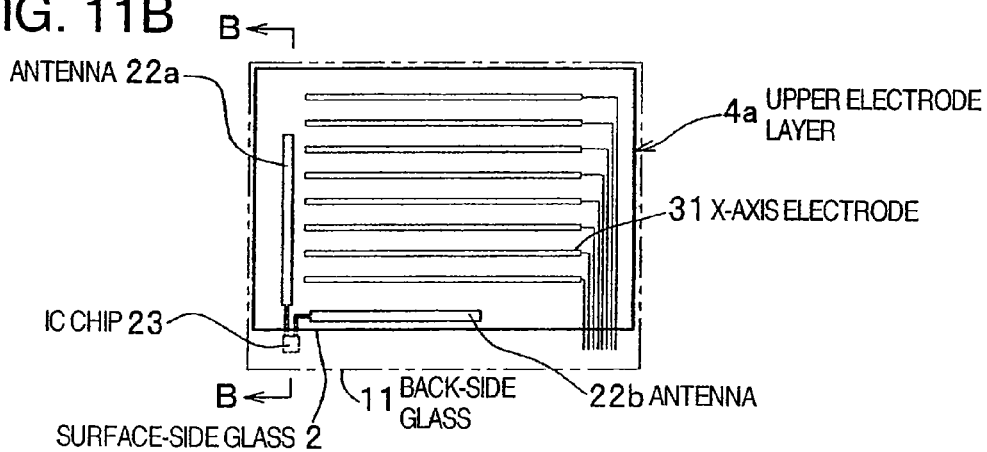
Figure 11C:
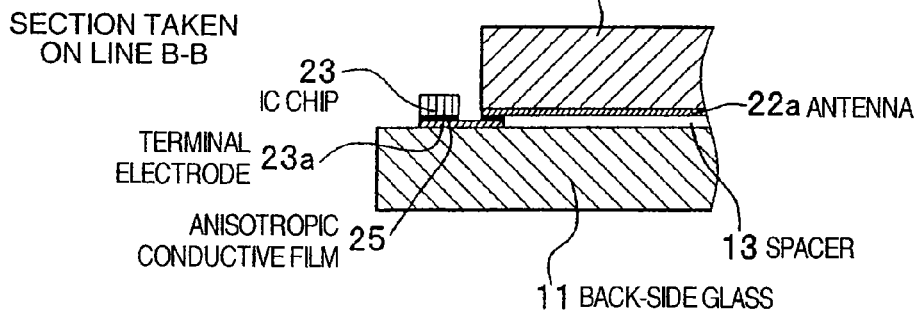
Figure 11D:
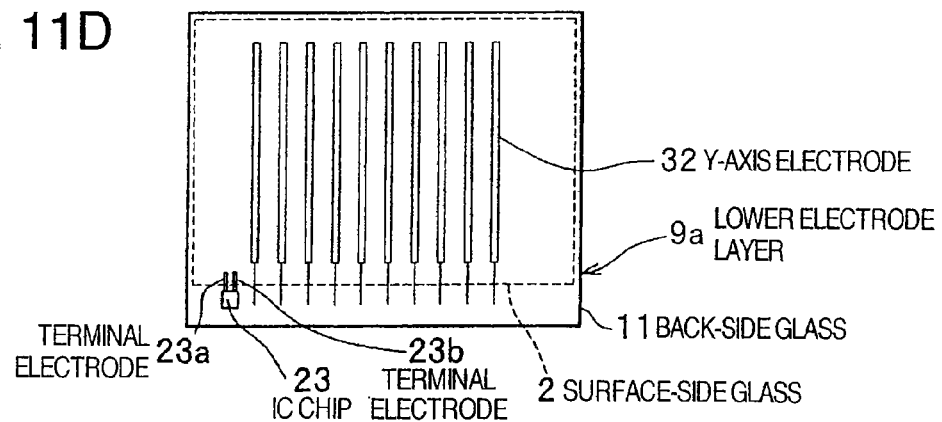

First, description will be made about Variation 1 of Embodiment 2 in which a wireless IC tag is mounted on a passive matrix type liquid crystal display. FIGS. 11A-11D are conceptual diagrams of Variation 1 in Embodiment 2 of the present invention in which a wireless IC tag is mounted on a passive matrix type liquid crystal display. FIG. 11A shows a laminated configuration of the liquid crystal display. FIG. 11B shows an upper electrode layer. FIG. 11C shows a partial section taken on line B-B in FIG. 11B. FIG. 11D shows a lower electrode layer.

Schematically, as shown in FIG. 11A, the passive matrix type liquid crystal display has a configuration in which a surface-side glass 2, an upper electrode layer 4a, a liquid crystal 6, a lower electrode layer 9a and a back-side glass 11 are laminated in that order. In addition, as shown in FIG. 11B, X-axis electrodes (image electrode) 31 are patterned and wired in a wide region of the upper electrode layer 4a. The surface-side glass 2 is disposed to surround the X-axis electrodes 31. Further, an antenna 22a and an antenna 22b are formed in a corner region of the upper electrode layer 4a where the X-axis electrodes 31 are not patterned and wired, and within the region of the surface-side glass 2. In addition, in the lower electrode layer 9a on the back-side glass 11, terminal electrodes 23a and 23b are formed in positions corresponding to the antennas 22a and 22b respectively. An IC chip 23 is fixedly attached through an anisotropic conductive film onto the back-side glass 11, and two terminals of the IC chip 23 are connected to terminal electrodes 23a and 23b.

The two terminals of the IC chip 23 are connected to the antennas 22a and 22b by the anisotropic conductive film through the terminal electrodes 23a and 23b respectively. Incidentally, each of the antennas 22a and 22b has an electric length of $\lambda/2$.

Next, the attachment configuration between each antenna and the IC chip in the wireless IC tag will be described with reference to FIG. 11C which is a sectional view taken on line B-B in FIG. 11B. The attachment configuration of the wireless IC tag in Variation 1 of Embodiment 2 shown in FIG. 11C is quite the same as the attachment configuration in Variation 1 of Embodiment 1 shown in FIG. 2C described above. That is, the attachment configuration of the wireless IC tag has no change even though the upper electrode layer 4a changes from the solid-wired common electrode 21 as shown in FIG. 2B to the X-axis electrodes 31 as shown in FIG. 11B.

That is, according to the configuration of the wireless IC tag shown in FIG. 11C, in the same manner as in the configuration shown in FIG. 2C, the antenna 22a is formed as a thin film on the back (that is, the surface opposite to the upper electrode layer 4a) of the surface-side glass 2. Terminal electrodes 23a and 23b are formed in the upper electrode layer 4a out of the region of the surface-side glass 2 and near the antenna 22a. Out of the region of the surface-side glass 2, the IC chip 23 is fixedly attached to the back-side glass 11 through an anisotropic conductive film, while two terminals of the IC chip 23 are connected to the terminal electrodes 23a and 23b respectively.

Figure 12A:
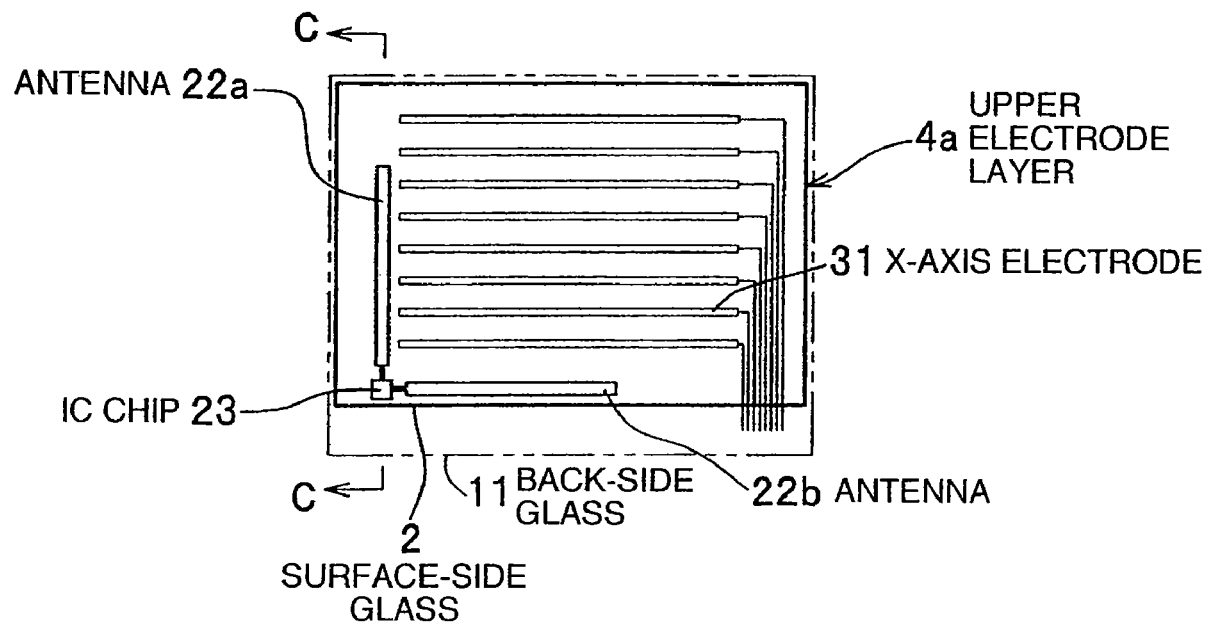
FIGS. 12A-12B are conceptual diagrams of Variation 2 in Embodiment 2 of the present invention in which a wireless IC tag is mounted on a passive matrix type liquid crystal display, FIG. 12A showing an upper electrode layer, FIG. 12B showing a partial section taken on line C-C in FIG. 12A.
Figure 12B:
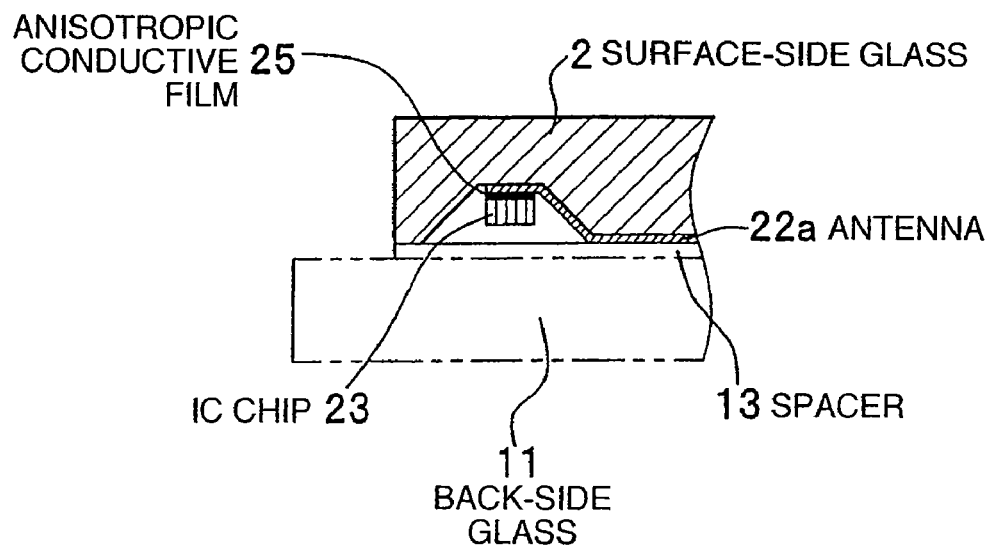

Next, description will be made about Variation 2 of Embodiment 2 in which a wireless IC tag is mounted on a passive matrix type liquid crystal display. FIGS. 12A-12B are conceptual diagrams of Variation 2 in Embodiment 2 of the present invention in which a wireless IC tag is mounted on a passive matrix type liquid crystal display. FIG. 12A shows an upper electrode layer, and FIG. 12B shows a partial section taken on line C-C in FIG. 12A. In Variation 2 of Embodiment 2, as shown in FIG. 12A, antennas 22a and 22b and an IC chip 23 are included in the region of the surface-side glass 2. Accordingly, as shown in FIG. 12B, a concave portion is provided in the surface-side glass 2 so as to place the IC chip 23, and an anisotropic conductive film 25 is engaged in fixedly attaching the IC chip 23 and connecting the terminals of the IC chip 23 to the antennas 22a and 22b respectively. The arrangement configuration of the antennas 22a and 22b and the IC chip 23 disposed thus is quite the same as that in Variation 2 of Embodiment 1 shown in FIGS. 3A-3B. Therefore, description about the arrangement configuration will be omitted here.

Figure 13A:
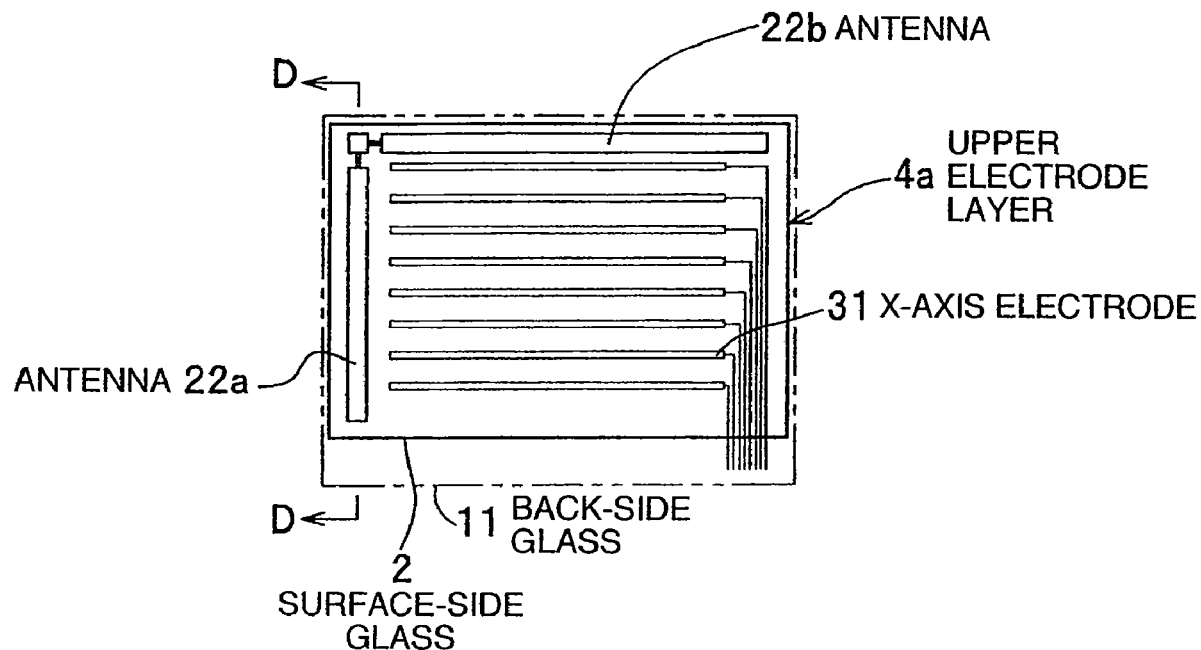
FIGS. 13A-13B are conceptual diagrams of Variation 3 in Embodiment 2 of the present invention in which a wireless IC tag is mounted on a passive matrix type liquid crystal display, FIG. 13A showing an upper electrode layer, FIG. 13B showing a partial section taken on line D-D in FIG. 13A.
Figure 13B:
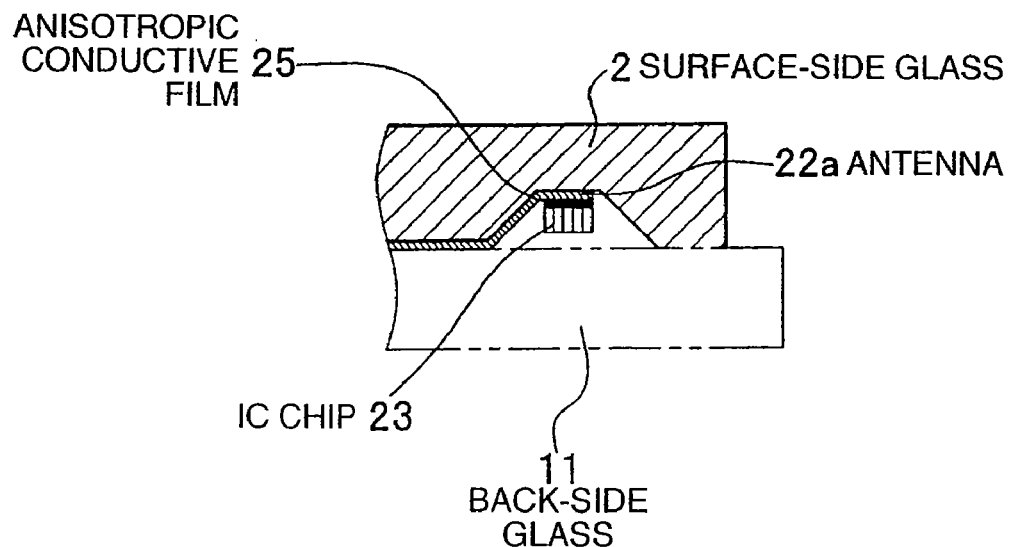

Next, description will be made about Variation 3 of Embodiment 2 in which a wireless IC tag is mounted on a passive matrix type liquid crystal display. FIGS. 13A-13B are conceptual diagrams of Variation 3 in Embodiment 2 of the present invention in which a wireless IC tag is mounted on a passive matrix type liquid crystal display. FIG. 13A shows an upper electrode layer, and FIG. 13B shows a partial section taken on line D-D in FIG. 13A. Variation 3 of Embodiment 2 shown in FIGS. 13A-13B is different from Variation 2 of Embodiment 2 shown in FIGS. 12A-12B only in that the position where the antennas 22a and 22b and the IC chip 23 are disposed is changed from a left lower corner position to a left upper corner position. Therefore, the basic configuration has no change as to the arrangement/connection configuration of the antennas 22*a* and 22*b* and the IC chip 23, except that FIG. 12A and FIG. 13A are vertically symmetrical.

Figure 14A:
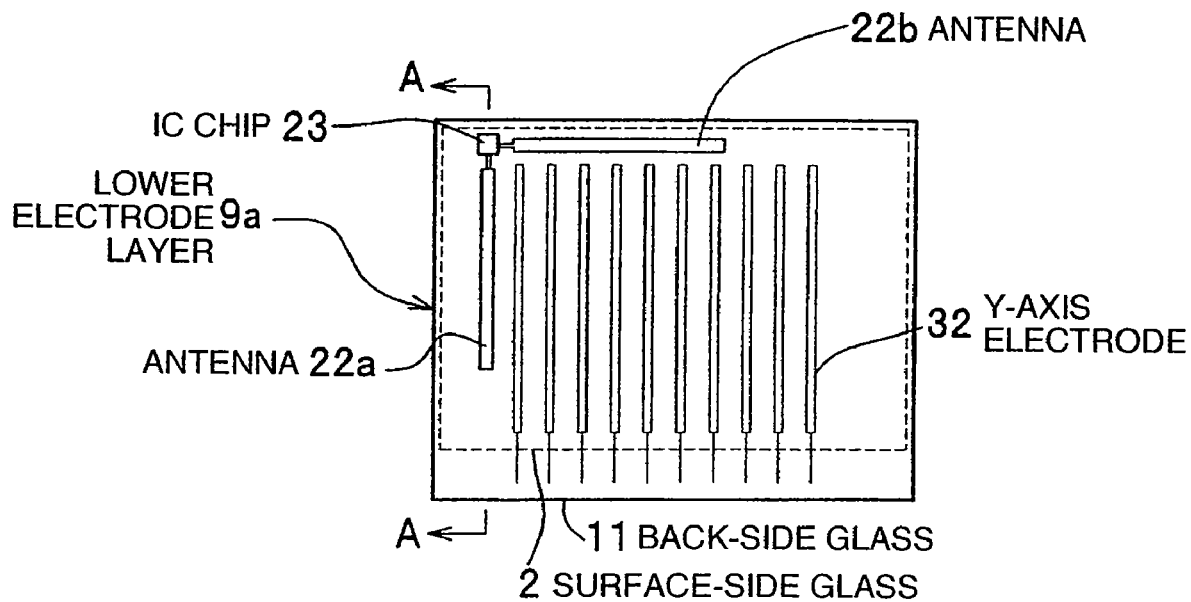
FIGS. 14A-14B are conceptual diagrams of Variation 4 in Embodiment 2 of the present invention in which a wireless IC tag is mounted on a passive matrix type liquid crystal display, FIG. 14A showing a lower electrode layer, FIG. 14B showing a partial section taken on line A-A in FIG. 14A.
Figure 14B:
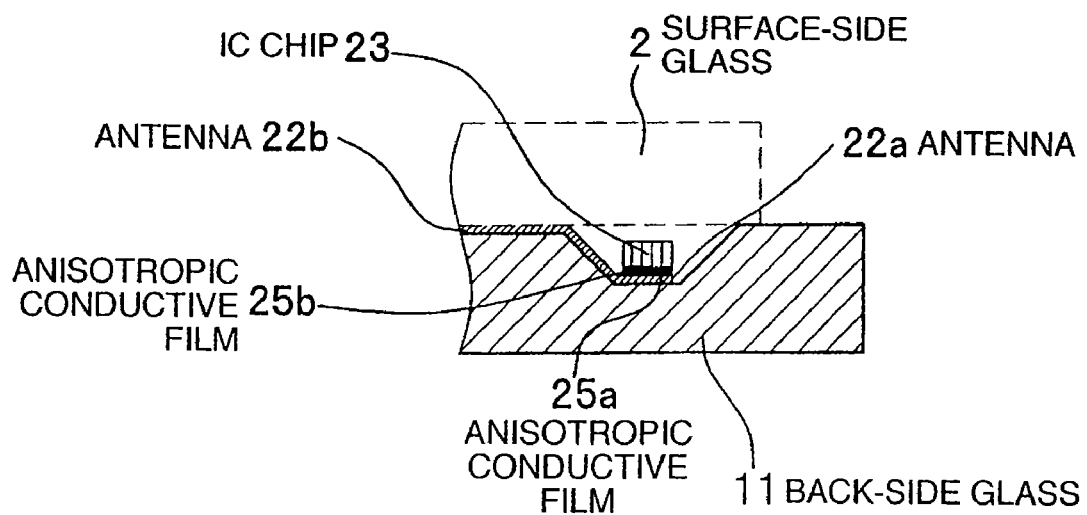

Next, description will be made about Variation 4 of Embodiment 2 in which a wireless IC tag is mounted on a passive matrix type liquid crystal display. FIGS. 14A-14B are conceptual diagrams of Variation 4 in Embodiment 2 of the present invention in which a wireless IC tag is mounted on a passive matrix type liquid crystal display. FIG. 14A shows a lower electrode layer, and FIG. 14B shows a partial section taken on line A-A in FIG. 14A. In Variation 4 shown in FIGS. 14A-14B, antennas 22*a* and 22*b* and an IC chip 23 are formed out of the region of a lower electrode layer 9*a* where Y-axis electrodes (image electrode) 32 are formed, and within the region of the back-side glass 11. Accordingly, as shown in FIG. 14B, a concave portion is provided in the back-side glass 11 so as to place the IC chip 23, and a terminal of the IC chip 23 is connected to the antenna 22*a* through an anisotropic conductive film 25*a*.

Embodiment 3

Figure 15A:
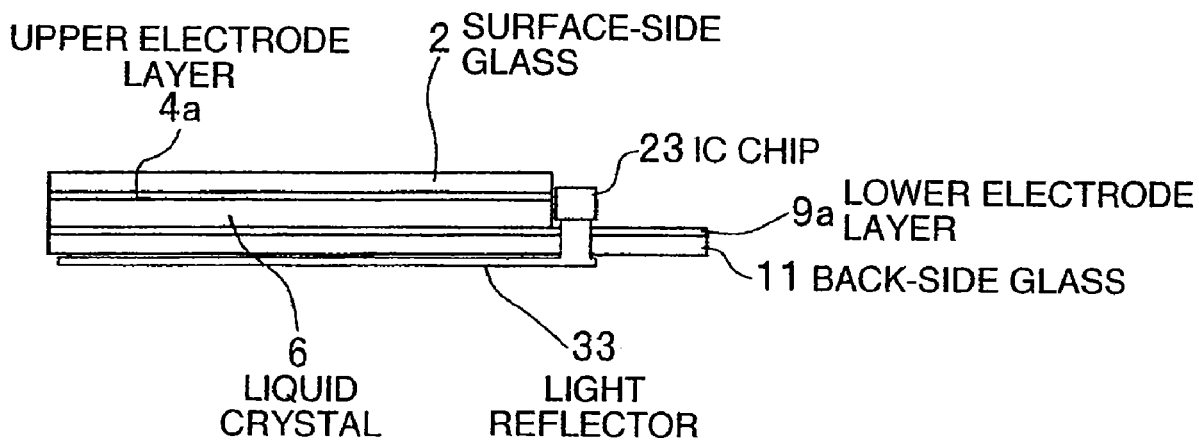
FIGS. 15A-15B are conceptual diagrams of Embodiment 3 of the present invention in which a wireless IC tag is mounted on a liquid crystal display having a light reflector, FIG. 15A showing a sectional view of the liquid crystal display, FIG. 15B showing a plan view of the liquid crystal display.
Figure 15B:
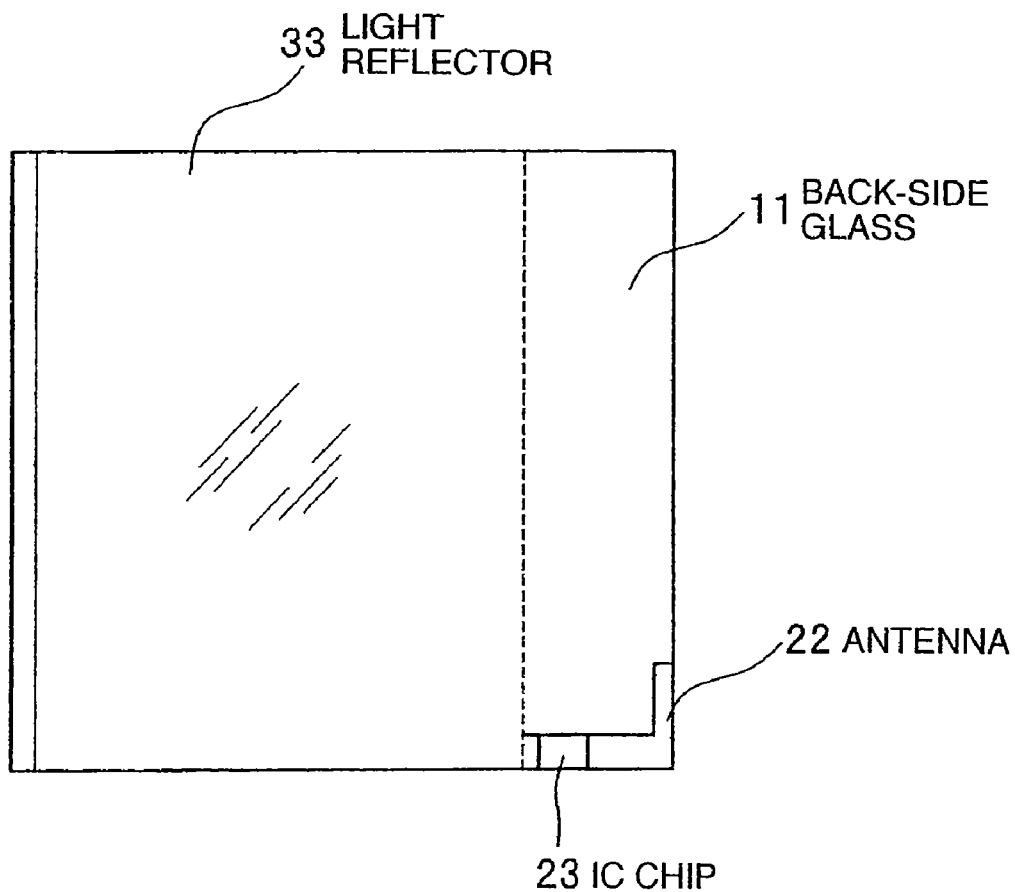

Next, description will be made about Embodiment 3 in which a wireless IC tag is mounted on a liquid crystal display having a light reflector. FIGS. 15A-15B are conceptual diagrams showing Embodiment 3 of the present invention in which a wireless IC tag is mounted on a liquid crystal display having a light reflector. FIG. 15A shows a sectional view of the liquid crystal display, and FIG. 15B shows a plan view of the liquid crystal display. As shown in FIG. 15A, the liquid crystal display has a laminated configuration of a surface-side glass 2, an upper electrode layer 4*a*, a liquid crystal 6, a lower electrode layer 9*a*, a back-side glass 11 and a light reflector 33. In the liquid crystal display configured thus, as shown in FIG. 15B, an antenna 22 is connected to one terminal of an IC chip 23, while the light reflector 33 is connected to the other terminal of the IC chip 23 so that the light reflector 33 can serve as a radiation surface of the antenna. In this case, it is desired that the terminal of the IC chip 23 and the light reflector 33 are Ohmically coupled using an anisotropic conductive film. In such a manner, when the light reflector 33 is used as the radiation surface of the antenna, an existing liquid crystal display can be used as it is.

Figure 16A:
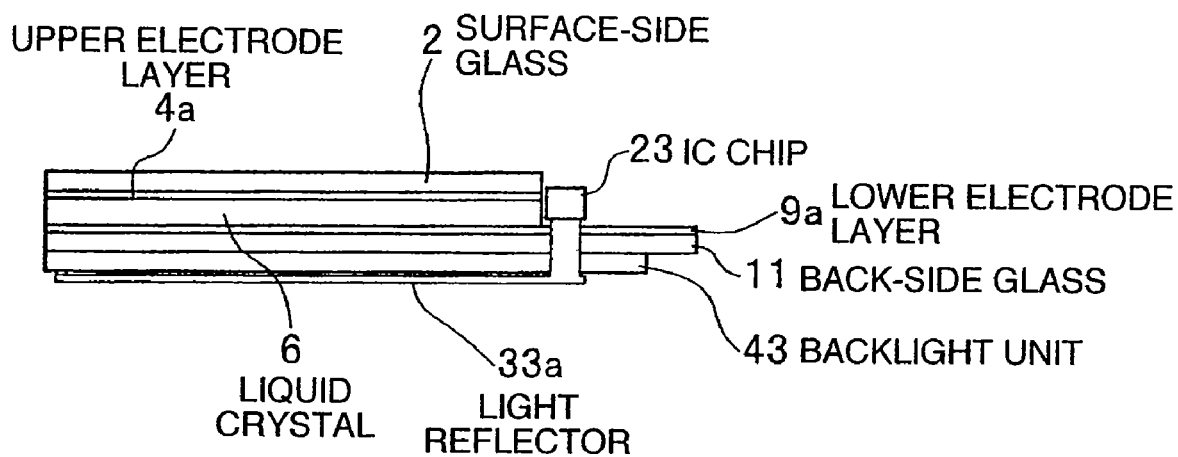
FIGS. 16A-16B are conceptual diagrams of a modification of Embodiment 3 of the present invention in which a wireless IC tag is mounted on a liquid crystal display having a backlight unit and a light reflector, FIG. 16A showing a sectional view of the liquid crystal display, FIG. 16B showing a plan view of the liquid crystal display.
Figure 16B:
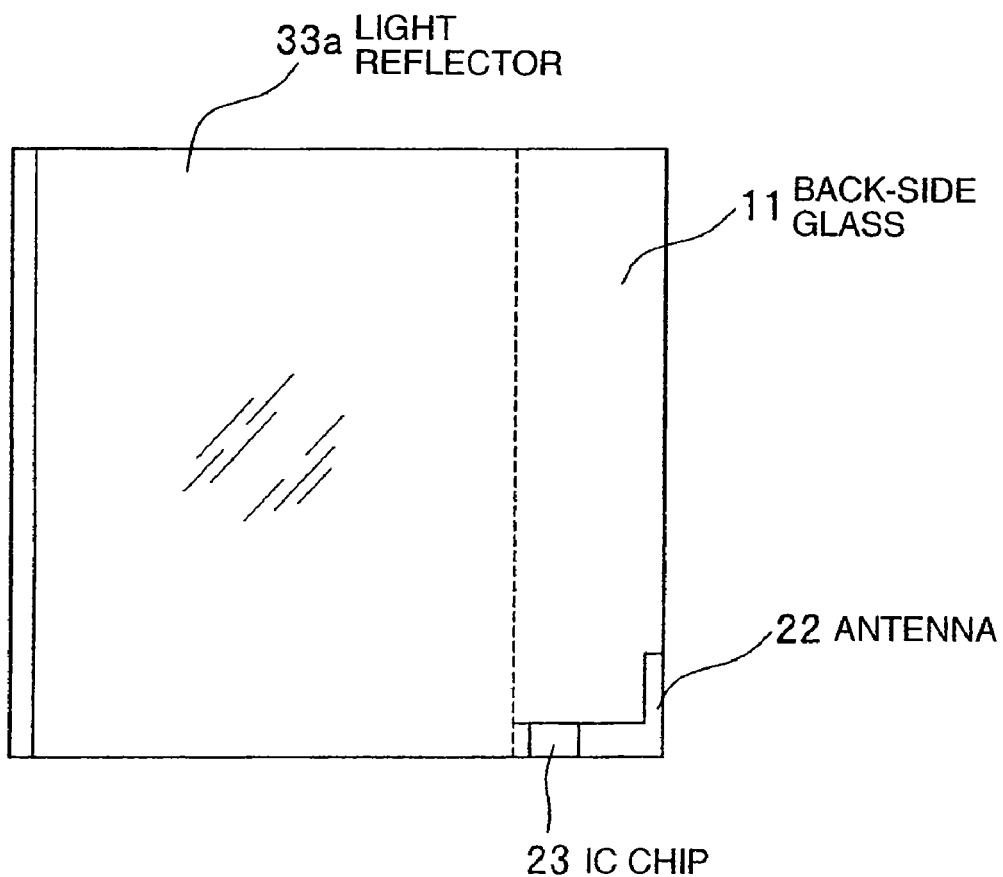

FIGS. 16A-16B are conceptual diagrams showing a modification of Embodiment 3 of the present invention, in which a wireless IC tag is mounted on a liquid crystal display having a backlight unit and a light reflector. FIG. 16A shows a sectional view of the liquid crystal display, and FIG. 16B shows a plan view of the liquid crystal display. As shown in FIGS. 16A-16B, an a light reflector 33*a* connected to the other terminal of an IC chip 23 can serve as a radiation surface of an antenna even when a backlight unit 43 and the light reflector 33*a* are disposed on the back of a back-side glass 11 in that order.

Embodiment 4

Next, description will be made about an embodiment in which a wireless IC tag is mounted on a liquid crystal seven-segment display having seven display segments forming the figure of numeral 8 for use in an electronic calculator or the like. In this case, description will be divided into the case where a wireless IC tag is mounted on a liquid crystal display using a static drive system for driving display segments individually, and the case where a wireless IC tag is mounted on a liquid crystal display using a dynamic drive system for driving a plurality of segments in a lump.

Figure 17A:
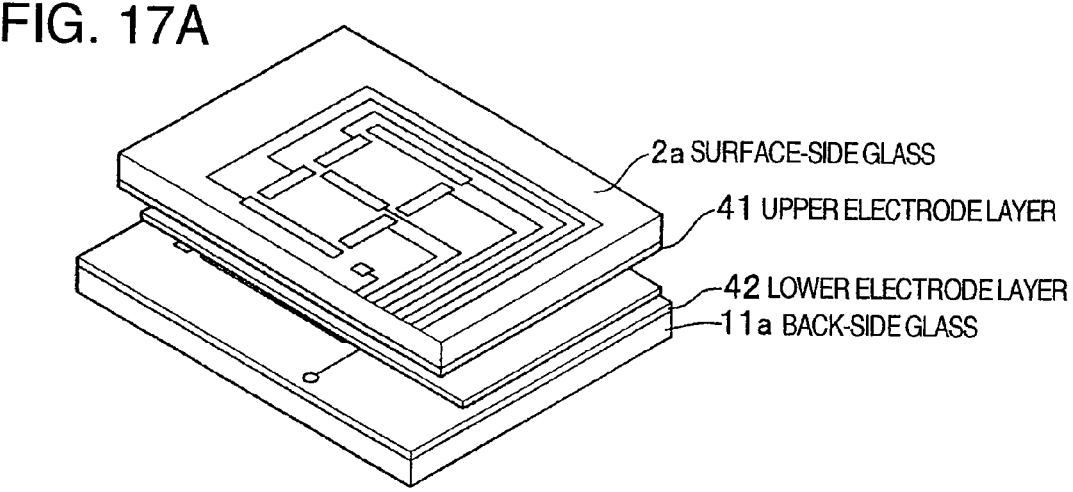
FIGS. 17A-17D are conceptual diagrams of Variation 1 in Embodiment 4 of the present invention in which a wireless IC tag is mounted on a static drive type liquid crystal display, FIG. 17A showing a laminated configuration of the liquid crystal display, FIG. 17B showing an upper electrode layer, FIG. 17C showing a partial section taken on line A-A in FIG. 17D, FIG. 17D showing a lower electrode layer.
Figure 17B:
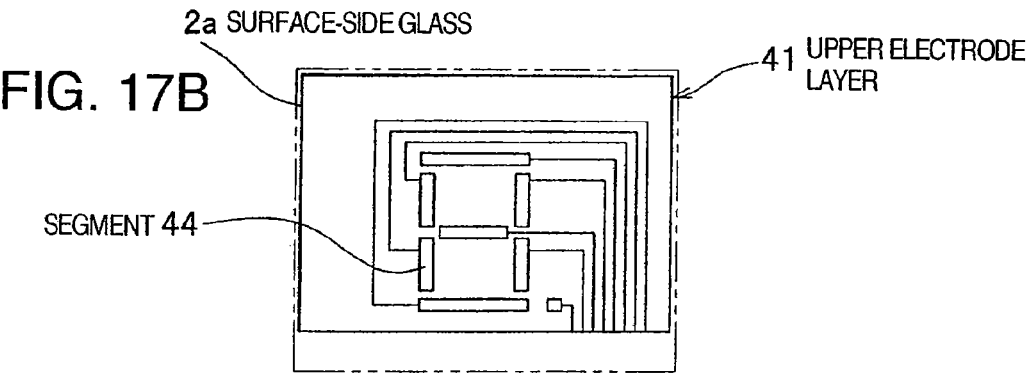
Figure 17C:
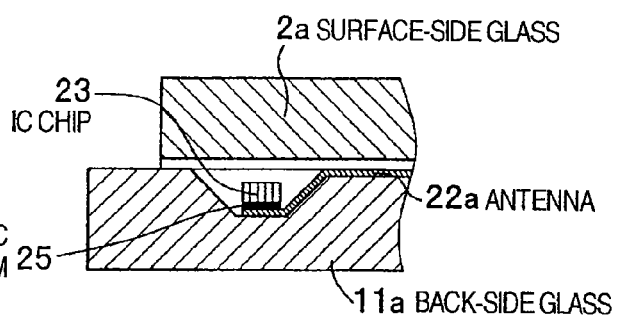
Figure 17D:
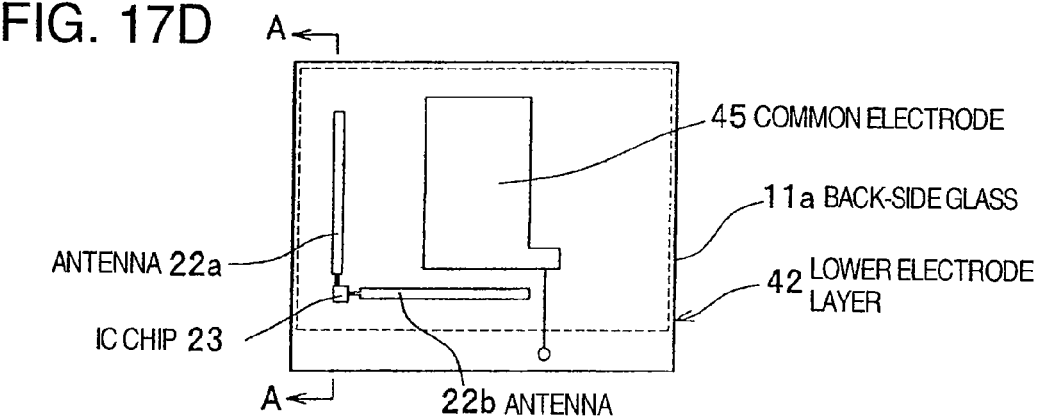

First, description will be made about Variation 1 of Embodiment 4 in which a wireless IC tag is mounted on a liquid crystal display using a static drive system. FIGS. 17A-17D are conceptual diagrams of Variation 1 in Embodiment 4 of the present invention in which a wireless IC tag is mounted on a liquid crystal display using a static drive system. FIG. 17A shows a laminated configuration of the liquid crystal display. FIG. 17B shows an upper electrode layer. FIG. 17C shows a partial section taken on line A-A in FIG. 17D. FIG. 17D shows a lower electrode layer.

The static drive type liquid crystal display is constituted by an upper electrode layer 41 and a lower electrode layer 42 as shown in FIG. 17A Seven-segment display segments (image electrodes) 44 are formed in the upper electrode layer 41 as shown in FIG. 17B. In addition, as shown in FIG. 17D, a common electrode (image electrode) 45 is formed in the lower electrode layer 42, and antennas 22*a* and 22*b* are formed on the periphery of an end portion of the lower electrode layer 42 so as to keep away from the region of the common electrode 45. As shown in FIG. 17C, a concave portion is provided in a back-surface glass 11*a* so as to place an IC chip 23. Two terminals of the IC chip 23 are connected to the antennas 22*a* and 22*b* through an anisotropic conductive film 25 respectively.

Figure 18A:
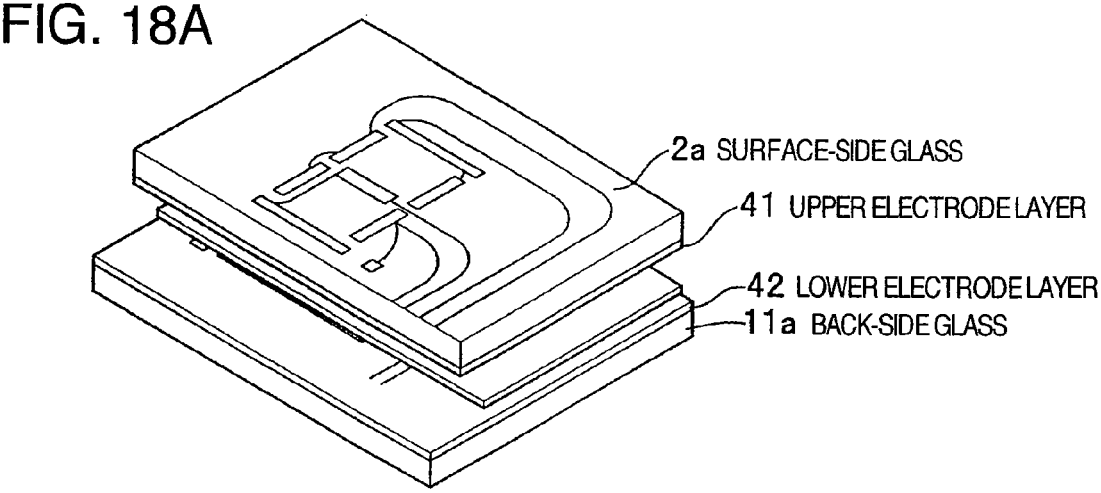
FIGS. 18A-18D are conceptual diagrams of Variation 2 in Embodiment 4 of the present invention in which a wireless IC tag is mounted on a static drive type liquid crystal display, FIG. 18A showing a laminated configuration of the liquid crystal display, FIG. 18B showing an upper electrode layer, FIG. 18C showing a partial section taken on line B-B in FIG. 18D, FIG. 18D showing a lower electrode layer.
Figure 18B:
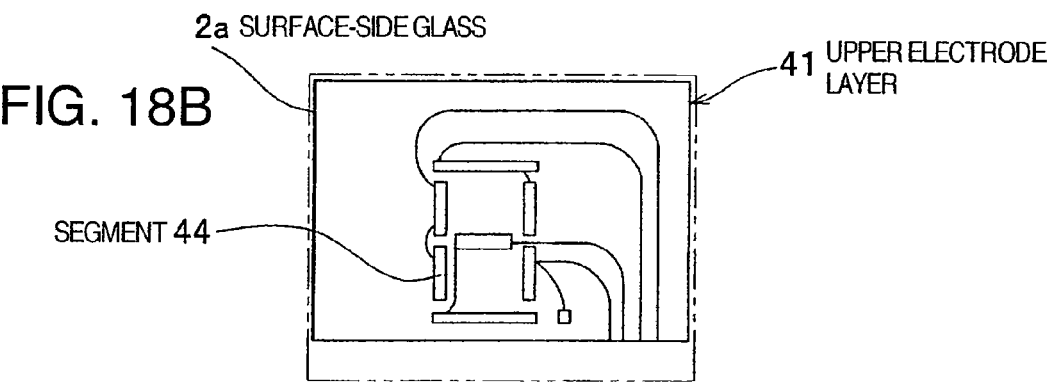
Figure 18C:
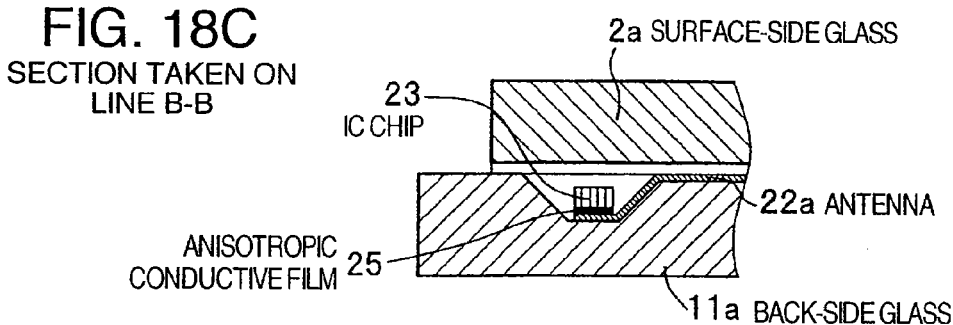
Figure 18D:
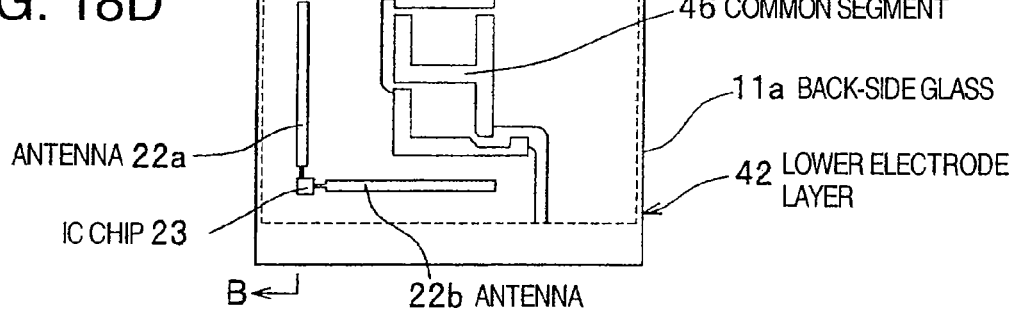

Next, description will be made about Variation 2 of Embodiment 4 in which a wireless IC tag is mounted on a liquid crystal display using a dynamic drive system. FIGS. 18A-18D are conceptual diagrams of Variation 2 in Embodiment 4 of the present invention in which a wireless IC tag is mounted on a liquid crystal display using a dynamic drive system. FIG. 18A shows a laminated configuration of the liquid crystal display. FIG. 18B shows an upper electrode layer. FIG. 18C shows a partial section taken on line B-B in FIG. 18D. FIG. 18D shows a lower electrode layer.

The dynamic drive type liquid crystal display is constituted by an upper electrode layer 41 and a lower electrode layer 42 as shown in FIG. 18A. Seven-segment display segments (image electrodes) 44 are formed in the upper electrode layer 41 as shown in FIG. 18B. In addition, as shown in FIG. 18D, other types of the display segments such as three-segment display segments (image electrodes) including a common segment 46 can be formed in the lower electrode layer 42, and antennas 22*a* and 22*b* are formed on the periphery of an end portion of the lower electrode layer 42 so as to avoid the region of the segments 46. As shown in FIG. 18C, a concave portion is provided in a back-surface glass 11*a* so as to place an IC chip 23. Two terminals of the IC chip 23 are connected to the antennas 22*a* and 22*b* through an anisotropic conductive film 25 respectively.

Add-Up

As described above, in a liquid crystal display mounted with an IC tag according to the present invention, each antenna and an IC chip are placed out of an available pixel region (that is, outside a display region) in the liquid crystal display so as to serve as a wireless IC tag. As a result, an image is disturbed less due to influence of the antenna on each transparent electrode. In addition, the effective length of the antenna can be made so long that the radio wave intensity of the antenna can be enhanced. Further, since the antenna is formed outside the available pixel region, the liquid crystal display does not increase in size. It is therefore possible to surely miniaturize a portable telephone or the like. When a desired distance is set between the antenna and the transparent electrode, the transparent electrode serves as an additional antenna so that the radio wave intensity can be further enhanced. Thus, the receiving sensitivity of a reader can be enhanced so that data of the IC chip mounted on the liquid crystal display can be read from a comparatively long distance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display with an IC tag mounted thereon, comprising;
    an IC chip for storing information; and
    an antenna for transmitting said information stored in said IC chip;
    wherein said IC chip and said antenna are mounted on said liquid crystal display, and said antenna is formed to be out of a region of image electrodes formed on a glass substrate of said liquid crystal display,
    wherein said glass substrate is composed of a surface-side glass and a back-side glass, and said antenna is formed on said surface-side glass.

2. A liquid crystal display with an IC tag mounted thereon according to claim 1, wherein said antenna is formed on an upper electrode of said surface-side glass.

3. A liquid crystal display with an IC tag mounted thereon according to claim 1, further comprising a light reflector mounted on a back-surface glass of said liquid crystal display.

4. A liquid crystal display with an IC tag mounted thereon according to claim 1, wherein said IC chip is mounted on said back-side glass and a terminal of said IC chip is connected to said antenna through an anisotropic conductive film.

* * * * *